United States Patent [19]

Kolawa et al.

[11] Patent Number: 5,784,553
[45] Date of Patent: Jul. 21, 1998

[54] METHOD AND SYSTEM FOR GENERATING A COMPUTER PROGRAM TEST SUITE USING DYNAMIC SYMBOLIC EXECUTION OF JAVA PROGRAMS

[75] Inventors: Adam K. Kolawa, Bradbury; Roman Salvador, LaJolla, both of Calif.

[73] Assignee: Parasoft Corporation, Monrovia, Calif.

[21] Appl. No.: 846,639

[22] Filed: Apr. 30, 1997

Related U.S. Application Data

[63] Continuation-in-part of Ser. No. 599,719, Feb. 12, 1996, which is a continuation-in-part of Ser. No. 587,208, Jan. 16, 1996, abandoned.

[51] Int. Cl.$^6$ .................................................. G06F 11/00
[52] U.S. Cl. ............................................... 395/183.14
[58] Field of Search .................... 395/183.14, 182.13, 395/183.13, 701; 364/275.5, 280.4, 489, 488, 578

[56] References Cited

U.S. PATENT DOCUMENTS

| 5,555,201 | 9/1996 | Dangelo et al. | 364/489 |
| 5,651,111 | 7/1997 | McKeeman et al. | 395/183 |

*Primary Examiner*—Vincent P. Canney
*Attorney, Agent, or Firm*—Christie, Parker & Hale, LLP

[57] ABSTRACT

A method and system for generating a test suite for a computer program written in the JAVA programming language. The JAVA program comprises program statements and program variables represented as JAVA source code and compiled by a JAVA compiler into JAVA bytecodes, including at least one input statement having one or more input variables, that are grouped into code blocks and stored in a program database. The test suite comprises sets of inputs. Each of the sets of inputs corresponds to a pth in the program. The program statements corresponding to a candidate code block are read from the program database. Each of the input variables for each input statement and each of the program variables that depend on them are represented in symbolic form as a symbolic memory value and transforming each program statement dependent on such an input variable into a symbolic expression. A trial set of inputs for each of the input statements is created by finding a solution to the symbolic expression obtained using dynamic symbolic execution. The trial set of inputs are stored into the test suite if coverage of the candidate code block was obtained. A dynamic symbolic execution consists of a symbolic execution of the program performed along the path that corresponds to the trial set of actual inputs. The first input to the program is generated randomly. From that first input, inputs satisfying any coverage criteria can be obtained by performing the above procedure iteratively.

26 Claims, 30 Drawing Sheets

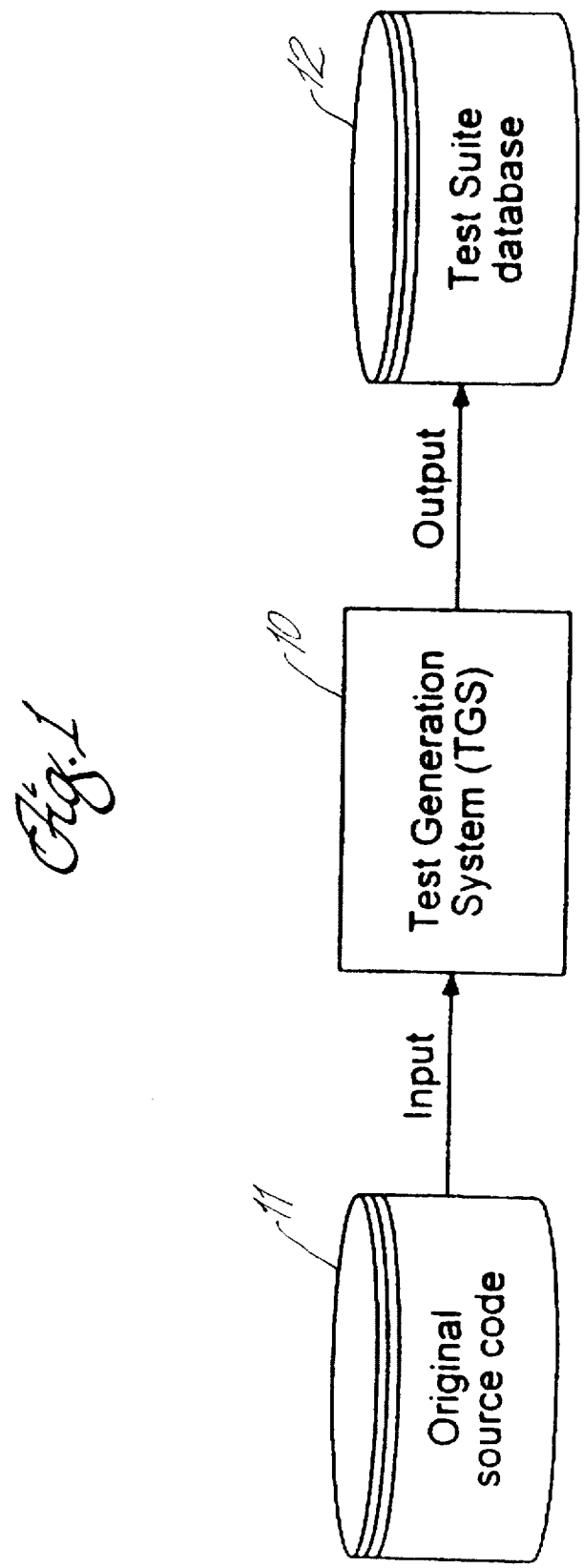

FIG. 2B

```
1   451-func_decl name=main [tst.c:2] type=450; [P glb norm] body=478;
2   450--function type=26; [P]
3   478--block prev==451; [tst.c:2-15] scope=453; body=459;
4   453---var_decl name=c [tst.c:3] type=26; [P] next=455;
5   459----comp_stmt [tst.c:5-5] body=458; next=471;
6   458-----modify_expr type=26; [P] ops=453; 457;
7   457------call_expr type=26; tgs_node=451; [P] ops=455; <>;
8   481-------tgs_node type=26; [] key=2, index=0, elem=0
9   471----if [tst.c:7-12] cond=461; then=463; else=470; next=477;
10  461-----equality type=26; [P] ops=453; 460;
11  460------cons.integer=97; type=22; [P]
12  463-----comp_stmt prev=471; [tst.c:8-8] body=462;
13  462------modify_expr type=26; [P] ops=453; 78;
14  78-------cons.integer=1; type=26; [P]
15  470-----if prev=471; [tst.c:9-12] cond=465; then=467; else=469;
16  465------equality type=26; [P] ops=453; 464;
17  464-------cons.integer=98; type=22; [P]
18  467------comp_stmt prev=470; [tst.c:10-10] body=466;
19  466-------modify_expr type=26; [P] ops=453; 79;
20  79--------cons.integer=2; type;
21  469------comp_stmt prev=470; [tst.c:12-12] body=468;
22  468-------modify_expr type=26; [P] ops=453; 77;
23  77--------cons.integer=0; type=26; [P]
24  477----comp_stmp prev=478; [tst.c:14-14] body=476;
25  476-----call_expr type=26; [P] ops=473; 475;
26  475------list [P] value=77;
```

*FIG.2C*
```
1    dbase_table_IO:
2    tst.c: 5-[0\2]: c=getchar () ;
```

*FIG.2D*
```
1    FUNCTION: main, first_block=0, coverage=0%:
2
3    0 -> 1 2 [5:7]
4       <-
5    getchar
6    5: c=getchar ();
7    6:
8    7: if (c=='a')
9    branch_cond_type=BRANCH_IF, key=[0\3]
10
11   1 -> 5 [8:8]
12      <- 0
13   8: c=1;
14
15   2 -> 3 4 [9:9]
16      <- 0
17   9:else if (c=='b')
18   branch_cond_type=BRANCH_IF, key=[0\5]
19
20   3 -> 5 [10:10]
21      <- 2
22   10: c=2;
23
24   4 -> 5 [12:12]
25      <- 2
26   12: c=0;
27
28   5 -> [14:14]
29      <- 3 4 1
30   exit
31   14: exit (0);
```

*FIG.4A*
```
1    main ()
2    {
3      int c;
4
5      c=getchar ();
6
7      if (c=='a')
8      c=1;
9      else if (c=='b')
10     c=2;
11     else
12     c=0;
13
14     exit (0);
15   }
```

FIG. 4B

```
1   main () {
2       int _Insight_spmark;
3       int _Insight_1;
4       int _Insight_2
5
6       _Insight_ltst815856321();
7       _Insight_func_top(1, 33855, (long) &_Insight_spmark, _Insight_strtable);
8       {
9           int c;
10
11          {
12              _Insight_cov_ptr[0]=1;
13              _Insight_tgs_block(0, 5, 0);
14          }
15          c=_Insight_tgs_getchar(2);
16          _Insight_1=_Insight_tgs_bc(0, (double) c-(double) 'a', 3);
17          if (_Insight_1) {
18              {
19                  _Insight_cov_ptr[1]=1;
20                  _Insight_tgs_block(1, 8, 0);
21              }
22              c=1;
23          } else {
24              {
25                  _Insight_cov_ptr[2]=1;
26                  _Insight_tgs_block(2, 9, 0);
27              }
28              _Insight_2=_Insight_tgs_bc(2, (double) c-(double) 'b',
29                  3);
30              if (_Insight_2) {
31                  {
32                      _Insight_cov_ptr[3]=1;
33                      _Insight_tgs_block(3, 10, 0);
34                  }
35                  c=2;
36              } else {
37                  {
38                      _Insight_cov_ptr[4]=1;
39                      _Insight_tgs_block(4, 12, 0);
40                  }
41                  c=0;
42                  {
43              }
44              {
45                  _Insight_cov_ptr[5]=1;
46                  _Insight_tgs_block(5, 14, 0);
47              }
48          _insight_cov_exit();
49          _Insight_tgs_exit();
50          _Insight_prog_end();
51          _Insight_stack_call(8940);
52          exit(0);
53      }
54  }
```

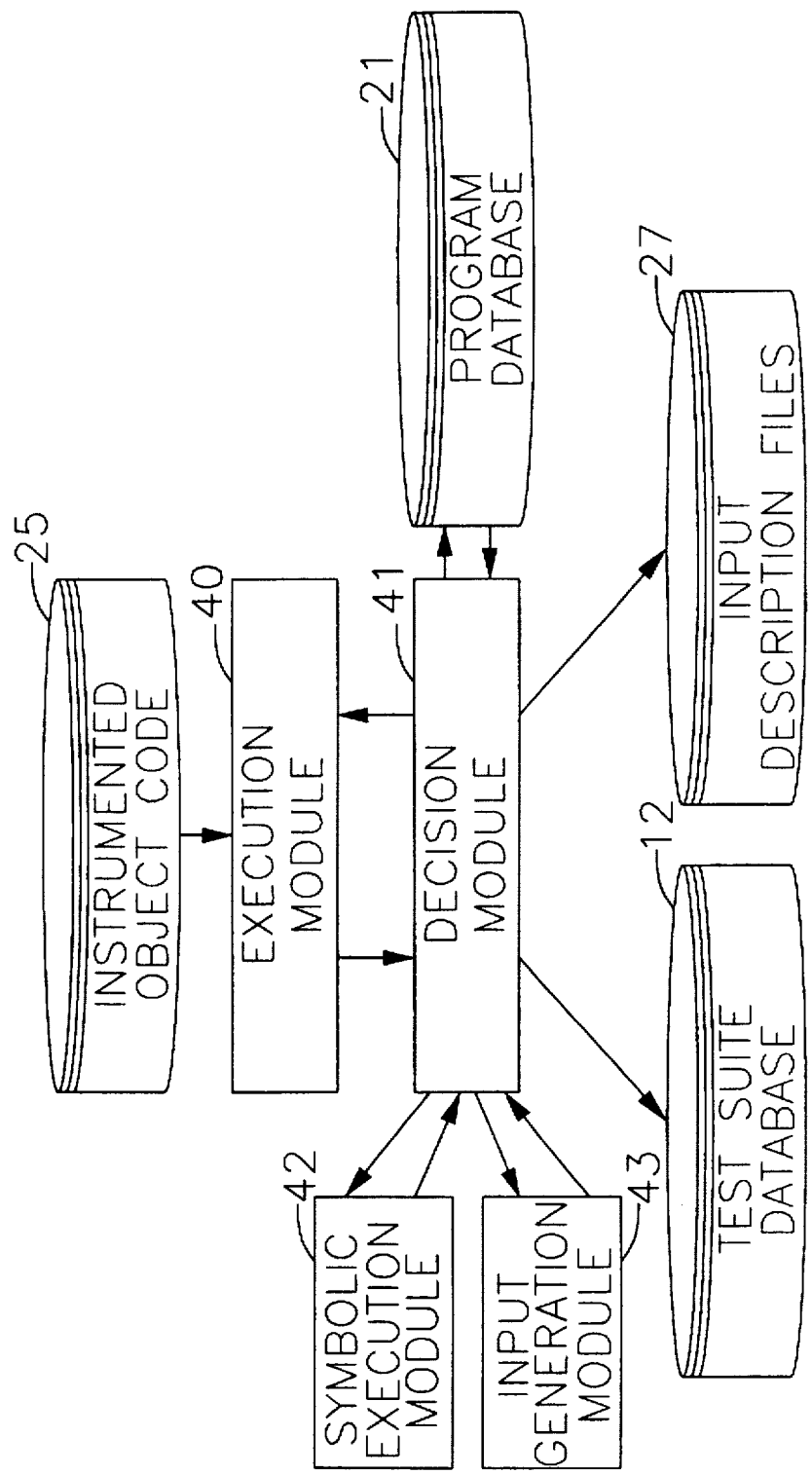

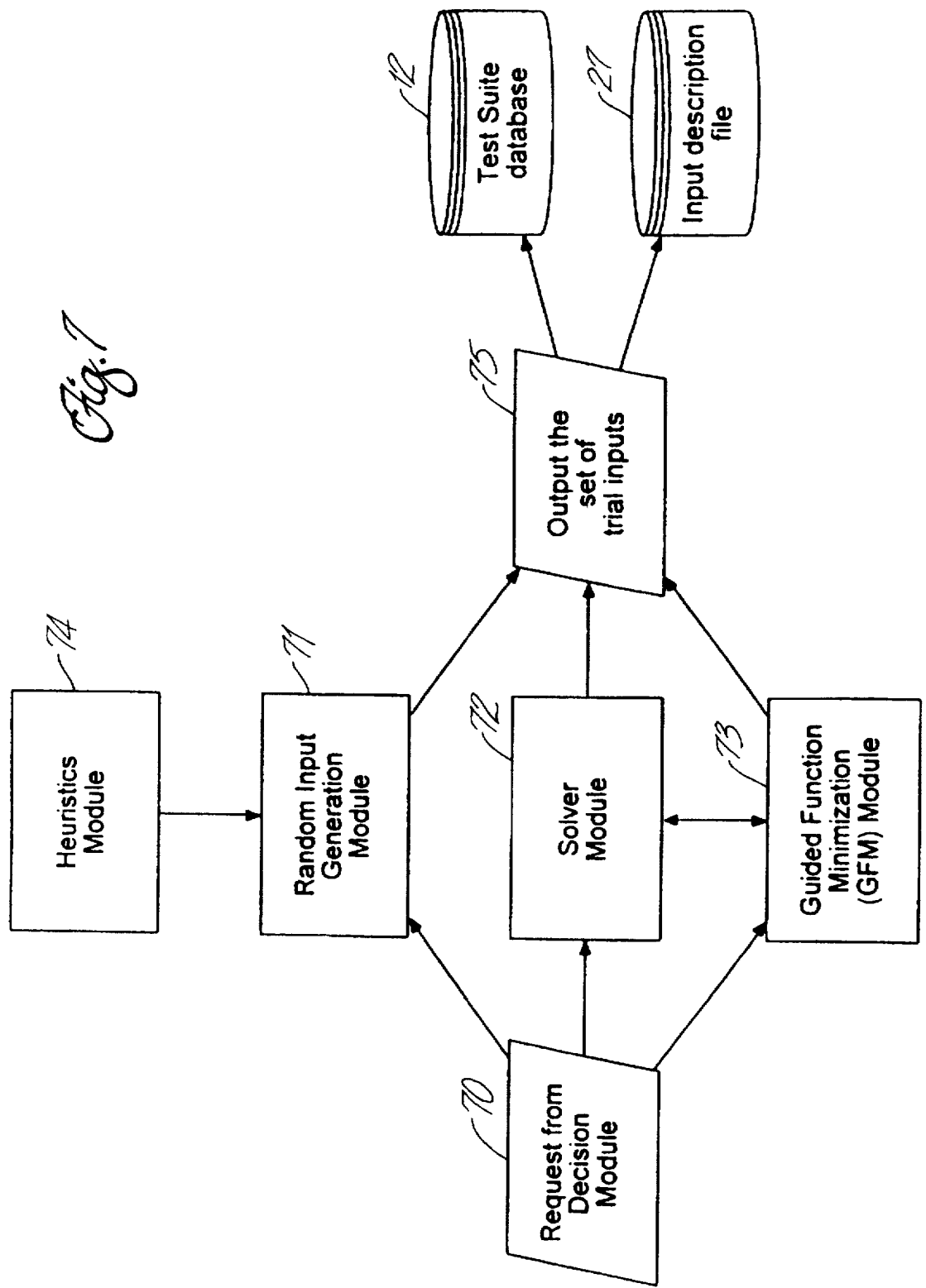

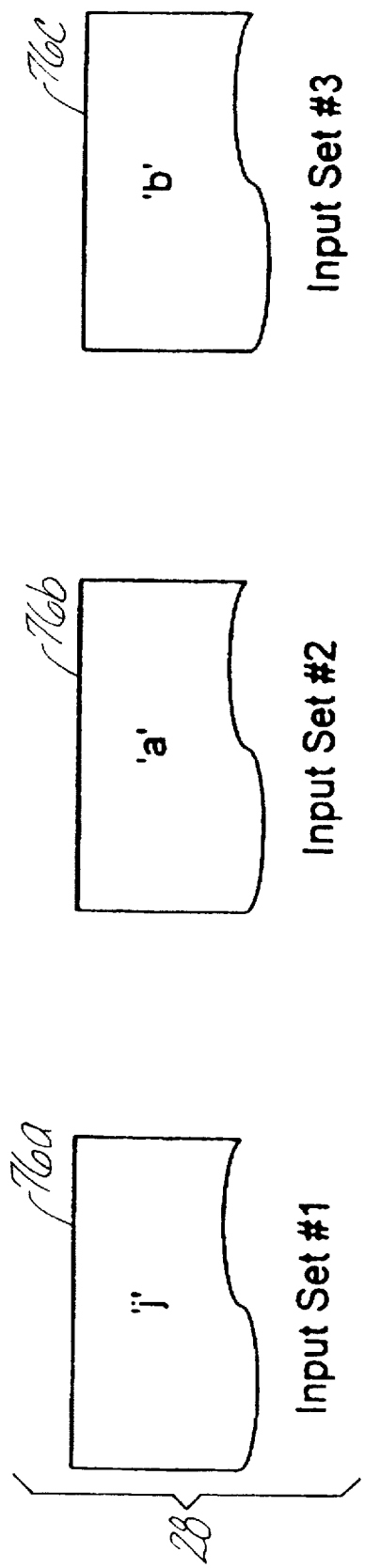

Fig. 8B 77a 1-[0\2]: size = 4, value = 106 'j'
Input Description File #1

77b 1-[0\2]: size = 4, value = 97 'a'
Input Description File #2

77c 1-[0\2]: size = 4, value = 98 'b'
Input Description File #3

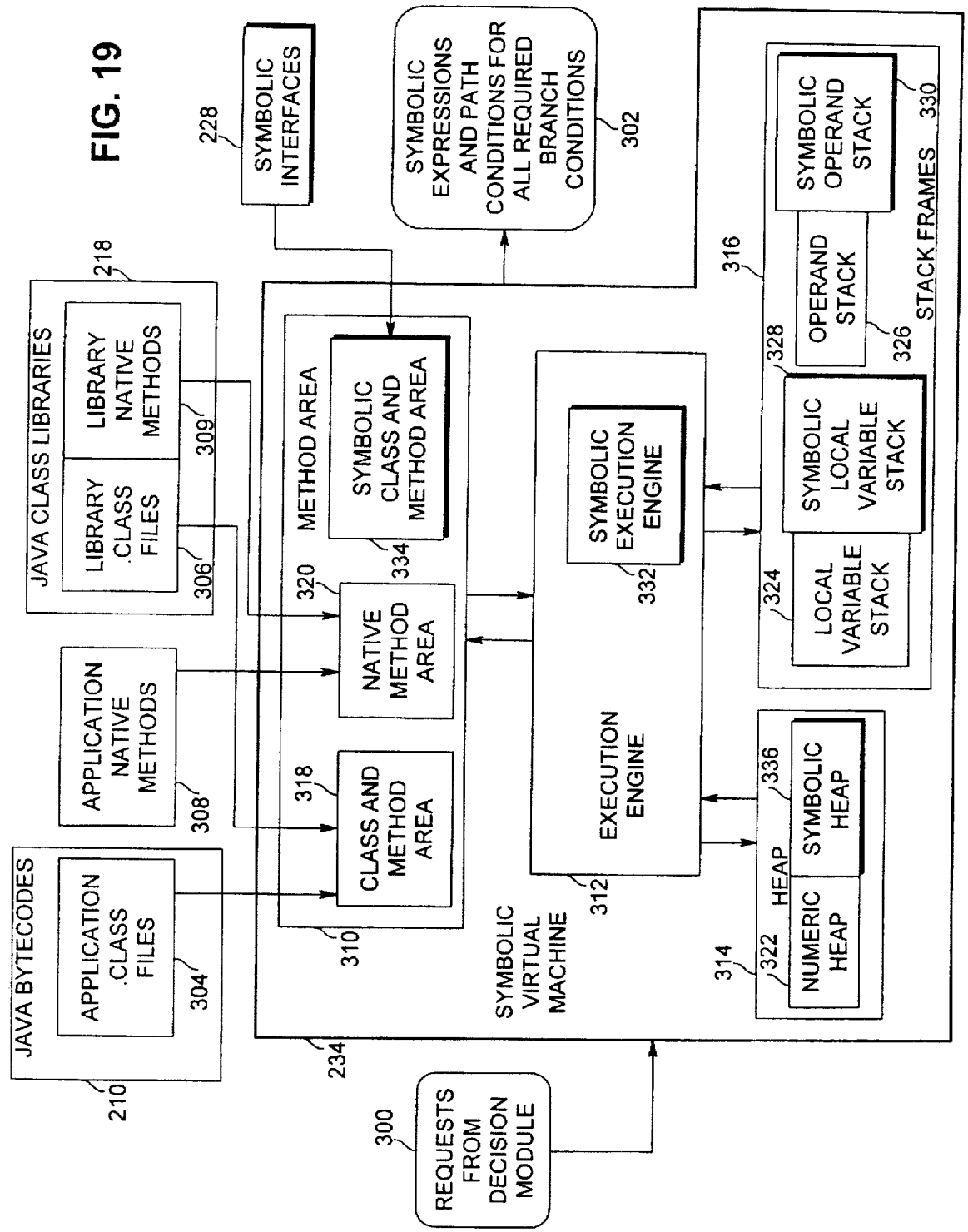

METHOD AND SYSTEM FOR GENERATING A COMPUTER PROGRAM TEST SUITE USING DYNAMIC SYMBOLIC EXECUTION OF JAVA PROGRAMS

CROSS REFERENCE TO RELATED APPLICATIONS

This patent application is a continuation-in-part application of a U.S. patent application entitled METHOD AND SYSTEM FOR GENERATING A COMPUTER PROGRAM TEST SUITE USING DYNAMIC SYMBOLIC EXECUTION, Ser. No. 08/599,719, filed Feb. 12, 1996, which is a continuation-in-part application of a U.S. patent application entitled METHOD AND SYSTEM FOR GENERATING A COMPUTER PROGRAM TEST SUITE USING DYNAMIC SYMBOLIC EXECUTION, Ser. No. 08/587,208, filed Jan. 16, 1996, now abandoned.

FIELD OF THE INVENTION

The present invention relates to a method and system for generating a computer program test suite and, in particular, to a method and system for generating a computer program test suite using dynamic symbolic execution for a compute program written in the JAVA programming language.

BACKGROUND OF THE INVENTION

Reliable and successful software can only be built through sound, efficient and thorough testing. Unfortunately, software testing is labor intensive and expensive and accounts for approximately 50 percent of commercial software development costs. At the same time, software testing is critical and necessary to achieving quality software.

Software testing involves three tasks: (1) test suite generation; (2) test suite execution validation; and (3) regression testing.

Test suite generation involves creating a set of inputs which force the program under test to execute different parts of the source code. This generated input set is called a "test suite." A good test suite covers most branch conditions and fully exercises the program's functionality.

Test suite execution validation involves executing the program using the test suite and evaluating the program's outputs to validate the program's correctness. Errors detected during this task are corrected and the process is repeated until all tests execute correctly.

Regression testing involves verifying new versions of the program by running the program against the test suite and comparing its outputs to the expected outputs from the original program. This task ensures that changes in the program source code do not introduce new defects.

Historically, test suite generation, test suite execution validation and regression testing were manual tasks. Only efforts to automate regression testing have proven successful. Nevertheless, as the size and complexity of software programs increase, the need to automate test suite generation and test execution validation becomes more important. Recent studies indicate that a typical company only tests 30 percent of the source code in the programs it develops. The remaining 70 percent is never tested. One reason is that manual testing only allows the most commonly executed paths to be tested. It is difficult to manually write test suites for testing infrequently executed paths or extreme conditions.

However, the difficulty in generating a test suite that executes most of the source code geometrically increases as the number of lines increases. During testing, source code statements are executed as paths through the source code. A significant number of paths need to be executed to force the program to test most of its source code statements. In a typical 10,000 line program, the number of execution paths grows geometrically to 100 million possible paths, thereby increasing the problem space by four orders of magnitude. As a result, it is infeasible and practically impossible to manually generate and validate a test suite that exercises most of the source code statements except in all but the shortest of computer programs.

Therefore, what is needed is an automated test suite generation tool for assisting a programmer in the generation and the execution validation of test suites capable of covering most source code branches and fully exercising a program's functionality. Desirably, such a tool would automatically generate a test suite for satisfying a required testing criteria, such as statement, branch, segment, error condition, data or total path coverage. Moreover, such a tool would be scalable to operate on programs of all sizes and in particular on programs comprising thousands to millions of lines of source code. In addition, such a tool would automatically generate different forms of input sets, including character and graphical input data. Such a tool would drastically reduce the cost of software development by reducing the man-hours spent on test suite generation, significantly improve software quality through complete testing of substantially all parts of a program and encourage programmers to test source code at earlier phases of the program development cycle. Additionally, such a tool should be extensible for adaptation to new programming languages and runtime environments such as the JAVA programming language and the JAVA virtual machine.

SUMMARY OF THE INVENTION

Accordingly, the present invention enables the above problems to be overcome by providing a method and system for generating a computer program test suite using dynamic symbolic execution. The invention is capable of finding an input for causing a program element, such as a program statement, to be executed in such a manner that is extendable to finding a minimal set of inputs for executing substantially every statement at least once and for taking substantially every branch at least once and optionally for generating as many paths as desired in the total path coverage set.

An embodiment of the present invention is a method and system for generating a test suite for a computer program. The computer program comprises program statements and program variables, including at least one input statement having one or more input variables, that are grouped into code blocks and stored in a program database. The test suite comprises sets of inputs. Each of the sets of inputs corresponds to each of the input statements. The program statements corresponding to a candidate code block are read from the program database. Each of the input variables for each input statement and each of the program variables are represented in symbolic form as a symbolic memory value and transforming each program statement dependent on such an input variable into a symbolic expression. A trial set of inputs for each of the input statements is created by finding a solution to the symbolic expression comprising actual input values corresponding to each symbolic memory value using dynamic symbolic execution. An execution run of the computer program is performed using the trial set of inputs and analyzing results obtained from the execution run for coverage of the candidate code block. The trial set of inputs are stored into the test suite if coverage of the candidate code block was obtained.

A further embodiment of the present invention is a method using a computer for creating a symbolic expression using dynamic symbolic execution for use in generating a test suite for a computer program. The computer program comprises program instructions and program variables, including input variables. The program instructions could be represented as nodes organized into a hierarchical parse tree, or in any other convenient way. The program variables and input variables are represented in symbolic form as symbolic memory values in nodes organized into a symbolic memory. A node for representing a program instruction is read from the parse tree. Symbolic memory values for each such program variable and each such input variable used by the program instruction are obtained from the symbolic memory. The program instructions are symbolically interpreted using the symbolic memory values instead of actual values for each such program variable and each such input variable used by the program instruction to create the symbolic expression.

Another embodiment of the present invention is a system for generating a test suite for use in testing a computer program written in the JAVA programming language, the computer program having been compiled by a JAVA compiler into JAVA bytecodes. The system includes a test generation system driver program for symbolically executing instructions of the computer program represented by the JAVA bytecodes to determine values of program variables of the computer program at selected points of execution and for finding input values to the computer program resulting in complete test coverage of the computer program according to a predetermined criteria based on the symbolic execution. The system also includes a test suite database for storing the input values as a test suite for testing the computer program.

Yet another embodiment of the present invention is a computer-implemented method of finding inputs that will generate runtime errors in a computer program written in the JAVA programming language, the computer program being represented by JAVA bytecodes after being compiled by a JAVA compiler. The method includes the steps of reading the JAVA bytecodes; obtaining an input value for the computer program; symbolically executing an instruction of the computer program represented in the JAVA bytecodes; examining all symbolic expressions on which the instruction depends based on the symbolic execution; and storing the input value in a test database and marking the input value as an input that generates a runtime error when a solution to the symbolic expressions generates an error condition.

A still further embodiment of the present invention is a method of generating a test suite for a module of an incomplete application program written in the JAVA programming language having undefined external references or a missing main method, the application program being represented by JAVA bytecodes after being compiled by a JAVA compiler. The method includes the steps of reading the JAVA bytecodes for the module; determining a sequence of JAVA methods to be called in the module and arguments to be passed to the JAVA methods; performing symbolic interpretation of the sequence of JAVA methods of the JAVA bytecodes by calculating symbolic expressions for the JAVA methods and using the symbolic expressions to determine input values causing a predetermined testing criteria to be satisfied; storing the input values in a test suite database when solutions for the predetermined testing criteria based on the symbolic expressions are found for the input values; and repeating the determining and performing steps when solutions are not found for the predetermined testing criteria based on the symbolic expressions.

Another embodiment of the present invention is a method of inserting instrumentation information into JAVA bytecodes produced by compiling a computer program written in the JAVA programming language. The method includes the steps of reading the JAVA bytecodes and the computer program; creating a parse tree for the computer program and analyzing the parse tree to identify points in the computer program where instrumentation can be inserted; analyzing the JAVA bytecodes and instrumenting the JAVA bytecodes at the identified points; and writing a new set of JAVA bytecodes including the instrumentation information.

Still other embodiments of the present invention will become readily apparent to those skilled in the art from the following detailed description, wherein is shown and described only embodiments of the invention by way of illustration of the best modes contemplated for carrying out the invention. As will be realized, the invention is capable of other and different embodiments and its several details are capable of modification in various obvious respects, all without departing from the spirit and scope of the present invention. Accordingly, the drawings and detailed description are to be regarded as illustrative in nature and not as restrictive.

DESCRIPTION OF THE DRAWINGS

FIG. 1 is a functional block diagram of a system for generating a computer program test suite constructed in accordance with the present invention;

FIG. 2B is a data structure for a parse tree stored in the program database of FIG. 2A;

FIG. 2C is a data structure for input statements stored in the program database of FIG. 2A;

FIG. 2D is a data structure for block and branch analysis information stored in the program database of FIG. 2A;

FIG. 4A is, by way of example, a source code listing of an original computer program;

FIG. 4B is, by way of example, a source code listing of an instrumented computer program;

FIG. 5 is a functional block diagram of the test generation system driver program of FIG. 2A;

FIG. 7 is a functional block diagram of the input generation module of FIG. 5;

FIG. 8A is, by way of example, a collection of files containing sets of inputs;

FIG. 8B is, by way of example, a collection of input description files;

FIG. 19 is a functional block diagram of the Symbolic Virtual Machine.

DETAILED DESCRIPTION OF THE INVENTION

I. Computer Program Test Suite Generation System
A. Overview

Referring to FIG. 1, a functional block diagram of a system for generating a computer program test suite constructed in accordance with the present invention is shown. The test generation system (TGS) 10, as further described hereinbelow in FIG. 2A, receives as an input a computer program expressed as original source code 11 and automatically generates as an output a test suite database 12. The test suite database contains sets of trial inputs 28 (shown in FIG. 2A) that can be used in test suite execution validation, regression testing or in other computer program evaluative tasks for detecting bugs and other problems with a computer program's structure or operation.

The original source code 11 is preferably organized into files, such as shown by way of example in FIG. 4A (as further described hereinbelow), which are stored on a secondary storage device not shown). The original source code 11 contains a series of programming language instructions that can be understood by the TGS 10. In the described embodiment, the C programming language is supported, although support of other programming languages is feasible.

The original source code 11 comprises all types of files used to express an uncompiled, that is, non-object code, computer program, including definitional and declarative files. For example, in the C programming language, header files are declarative files since they frequently declare but do not define program variables, structures and functions. Source code files, however, are definitional files since they typically contain definitions of program variables, structures and functions.

The test suite database 12 contains two types of data (shown in FIG. 2A): a set of inputs 28 and flow and coverage information 29. The set of inputs 28 forces the program under test to execute different parts of the source code, including branch conditions, and substantially exercises the program's functionality. The TGS 10 generates the set of inputs 28 such that a desired coverage criteria is satisfied if the program under test is run through substantially all of the sets of inputs 28. As further described hereinbelow in FIGS. 6A, 6B and 6C, each set of inputs 28 is added to the test suite database 12 to increase the overall code coverage and satisfy a required testing criteria, such as statement, branch, segment, error condition, data or total path coverage or any other testing criteria conventional in the art.

One common coverage criteria is branch coverage which requires substantially all code branches in the original source code 11 to be covered. The flow and coverage information 29 is used for determining whether the selected criteria has been satisfied and for indicating where problems encountered during program execution exist in the original source code 11.

Figure 2A:
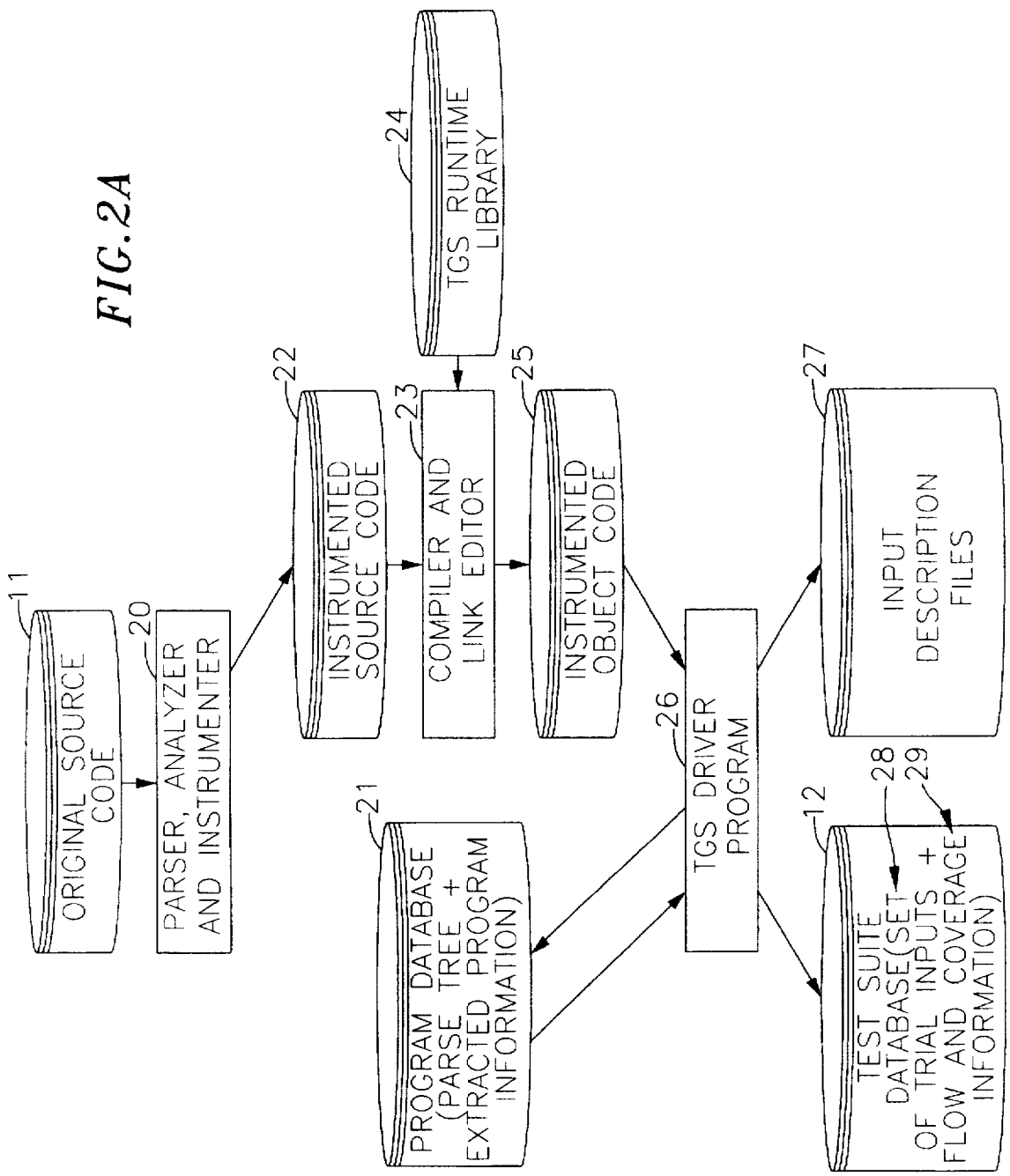
FIG. 2A is a functional block diagram of the test generation system of FIG. 1.

Referring to FIGS. 2B, 2C and 2D, the contents of the program database 21 (shown in FIG. 2A) are shown, by way of example, for a source code listing of an original computer program shown in FIG. 3B (as further described hereinbelow).

FIG. 2B is a data structure for storing a parse tree which describes the syntactic structure of the original computer program. It comprises a hierarchical representation of the instructions making up the original computer program beginning at line 1 of FIG. 4A expressed in a top-down manner, although any other form of parse tree is equally acceptable.

FIGS. 2C and 2D are data structures for storing flow and coverage information 29. FIG. 2C is a data structure for storing input statements extracted from the original computer program. In this example, the original computer program contains the single input statement "c=getchar ( );" on line 5 of FIG. 4A which calls the function getchar for obtaining a single input character. This input statement is stored on line 2 of the data structure of FIG. 2C and is assigned a key "5–[0/2]."

FIG. 2D is a data structure for storing block and branch analysis information extracted from the original computer program. Each program is broken down into a series of code blocks comprising one or more program statements occurring along a single path of execution. A branch condition causes a break in execution flow and results in two or more code blocks being formed. In this example, six code blocks are formed as shown in Table I below.

TABLE I

| Block # | Lines | Key | Original Source Code Lines |
|---|---|---|---|
| 1 | 3–8 | [5:7] | 5–7 |
| 2 | 11–13 | [8:8] | 8 |
| 3 | 15–17 | [9:9] | 9 |
| 4 | 20–22 | [10:10] | 10 |
| 5 | 24–26 | [12:12] | 12 |
| 6 | 28–31 | [14:14] | 14 |

As shown in Table I, each code block comprises several lines in the data structure of FIG. 2D and is assigned a key identifying the corresponding lines in the original computer program of FIG. 4A.

In the described embodiment, the TGS 10 is a computer program written in the C programming language, although other programming languages are feasible. The TGS 10 is executed by a general purpose programmed computer system (not shown) which operates on sets of instructions in the form of computer programs. Such a general purpose programmed computer system contains a central processing unit, volatile memory, secondary storage devices and other components conventional in the art. It is also envisioned that the TGS 10 can be embodied as a special purpose computer formed on an integrated circuit chip (or set of chips) or as executable computer code burned into a read-only memory (ROM) chip that can be read by conventional means or as micro code. An exemplary example of a TGS 10 is the TEST GENERATION SYSTEM product licensed by Parasoft Corporation, Monrovia, Calif.

B. Test Generation System Structure

Referring to FIG. 2A, a functional block diagram of the TGS 10 of FIG. 1 is shown. The original source code 11 is first processed by a parser, an analyzer and an instrumentor (block 20). The parser is conventional in the art and is used to generate a parse tree. The analyzer is also conventional in the art and is used to analyze and extract program information. Both the parse tree and the extracted program information are stored in the program database 21. The instrumentor introduces instrumentation function calls into the original source code 11 for use by the TGS 10 during test suite generation and to create instrumented source code 22, as further described hereinbelow in FIG. 3.

Next, the instrumented source code 22 is processed by a compiler and link editor (block 23). Both the compiler and link editor are conventional in the art and are used to generate instrumented object code 25. The link editor links in the instrumentation functions stored in a TGS run-time library 24 containing a library of linkable object modules corresponding to the instrumentation function calls introduced by the instrumentor (block 20).

The TGS driver program 26 accesses information in the program database 21 and uses it to find a set of inputs 28 for the program under test, as further described hereinbelow in FIG. 5. The TGS driver program 26 repeatedly executes the instrumented object code 25 and analyzes the output from each execution run to determine whether each trial set of inputs 28 results in additional code coverage. The TGS driver program 26 stores any additional program information learned during each execution run into the program database 21, each new set of inputs 28 and flow and coverage information 29 into the test suite database 12 and a corresponding description of the new set of inputs 28 into an input description file 27. In the described embodiment, each set of inputs 28 is stored in an individual file with a corresponding input description file 27 stored separately as further described hereinbelow in FIGS. 6B and 6C.

C. Original Source Code Instrumentation

Figure 3:
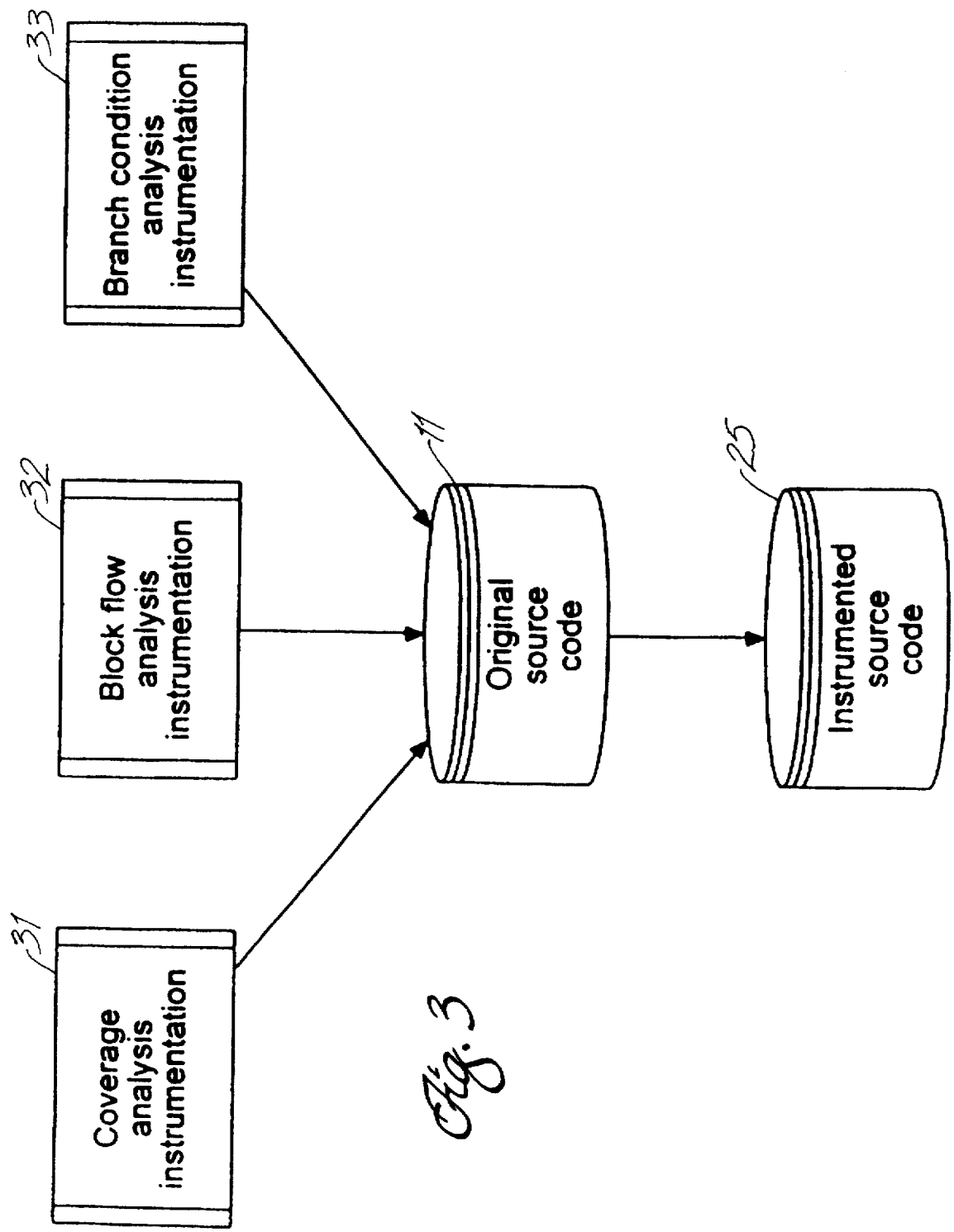
FIG. 3 is a functional block diagram of source code instrumentation.

Referring to FIG. 3, the instrumentor (block 20) introduces three types of instrumentation function calls into the original source code 11. These will be explained with further reference to FIGS. 4A and 4B which show, by way of example, a source code listing of an original source code 11 program and a corresponding source code listing of an instrumented source code 25 program, both written in the C programming language.

The first type of instrumentation is coverage analysis instrumentation 31 which enables the TGS 10 (shown in FIG. 1) to keep track of which code blocks of the program under test have been executed. For example, the instrumentation statement "_Insight_cov_ptr[0 ]=1;" on line 12 of FIG. 4B indicates that the code block running from lines 1 through 4 of FIG. 4A have been executed.

The second type of instrumentation is block flow analysis instrumentation 32 which enables the TGS 10 (shown in FIG. 1) to keep track of the control flow of the program under test. For example, the instrumentation statement "_Insight_tgs_block(0, 5, 0);" on line 13 of FIG. 4B indicates that the statement on line 5 of FIG. 4A has been reached.

The third type of instrumentation is branch condition analysis instrumentation 33 which enables the TGS 10 (shown in FIG. 1) to keep track of the values obtained while executing the program under test. This type of instrumentation transforms branch conditions in the original source code 11 into a form suitable for input generation. For example, the instrumentation statements "_Insight_1=_Insight_tgs_bc(0, (double) c−(double) 'a', 3); if (_Insight_1) { . . . " on lines 16 through 21 of FIG. 4B transforms the branch condition "if (c=='a')" on line 7 of FIG. 4A into a form usable by the TGS 10 for test suite generation. Other types of analysis instrumentation are feasible for satisfying different testing criteria.

After instrumentation, the instrumented source code 22 results in source code which is equivalent to the original source code 11 but containing additional instrumentation function calls.

II. TGS Driver Program Structure and Operation

A. Structure

Referring to FIG. 5, a functional block diagram of the TGS driver program 26 is shown. It consists of four modules: execution module 40, decision module 41, symbolic execution module 42 and input generation module 43.

The decision module 41 coordinates the operations performed by the other modules comprising the TGS driver program 26. It accesses the program database 21 to obtain parse tree and program information regarding the program under test and stores sets of inputs 28 into the test suite database 12 and input set information into the input description files 27.

The execution module 40 executes the instrumented object code 25 according to instructions received from the decision module 41. It analyzes the output from the program under test after each execution run and passes analysis information back to the decision module 41.

The symbolic execution module 42 performs static and dynamic symbolic executions of the program under test according to instructions received from the decision module 41. It passes analysis information back to the decision module 41.

The input generation module 43 generates a set of inputs 28 for the program under test using information passed to it by the decision module 41. It passes a trial set of inputs 28 back to the decision module 41.

B. Operation

Figure 6A:
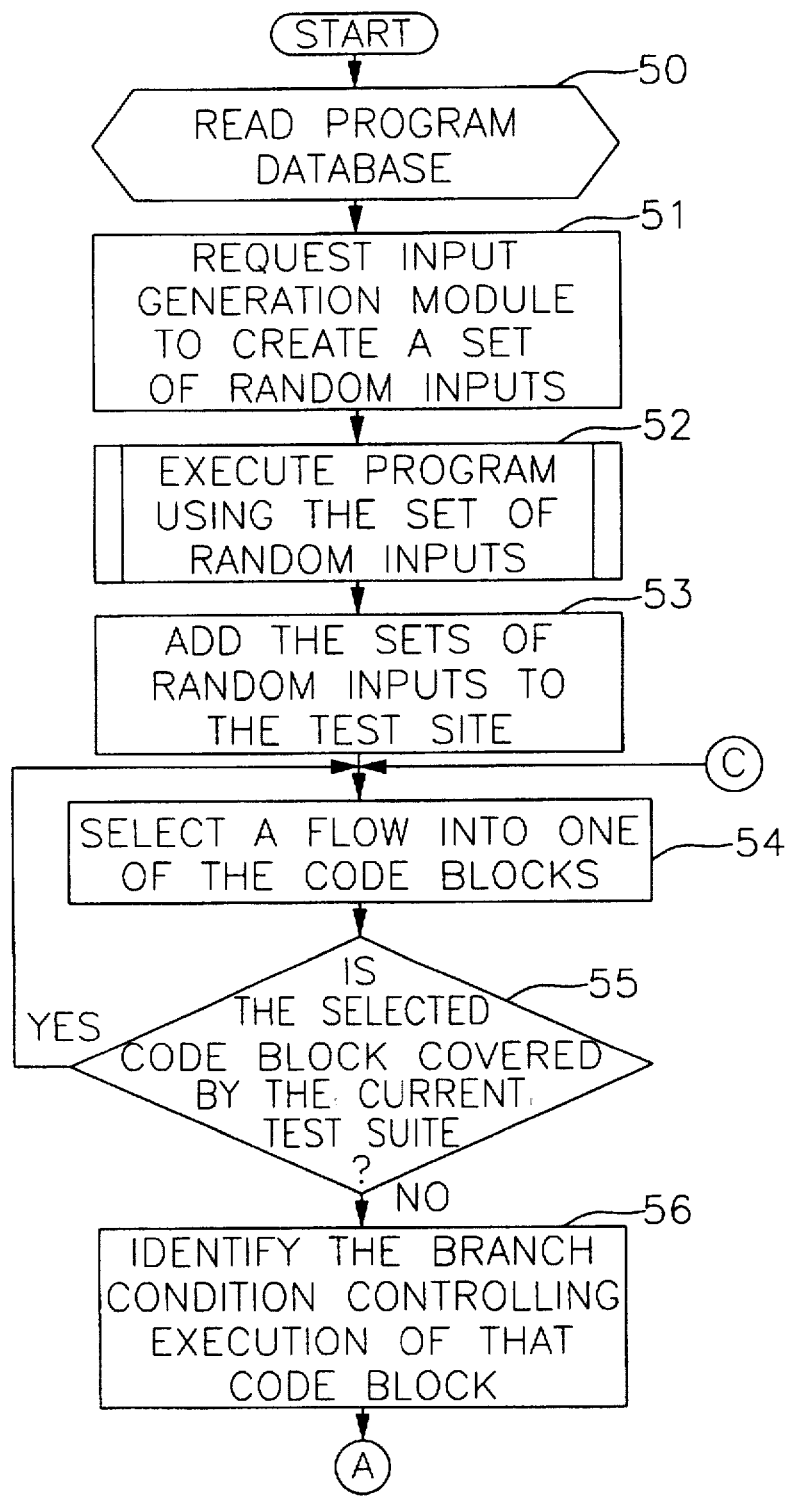
FIGS. 6A, 6B and 6C are a flow diagram of a method for generating a computer program test suite in accordance with the present invention.
Figure 6B:
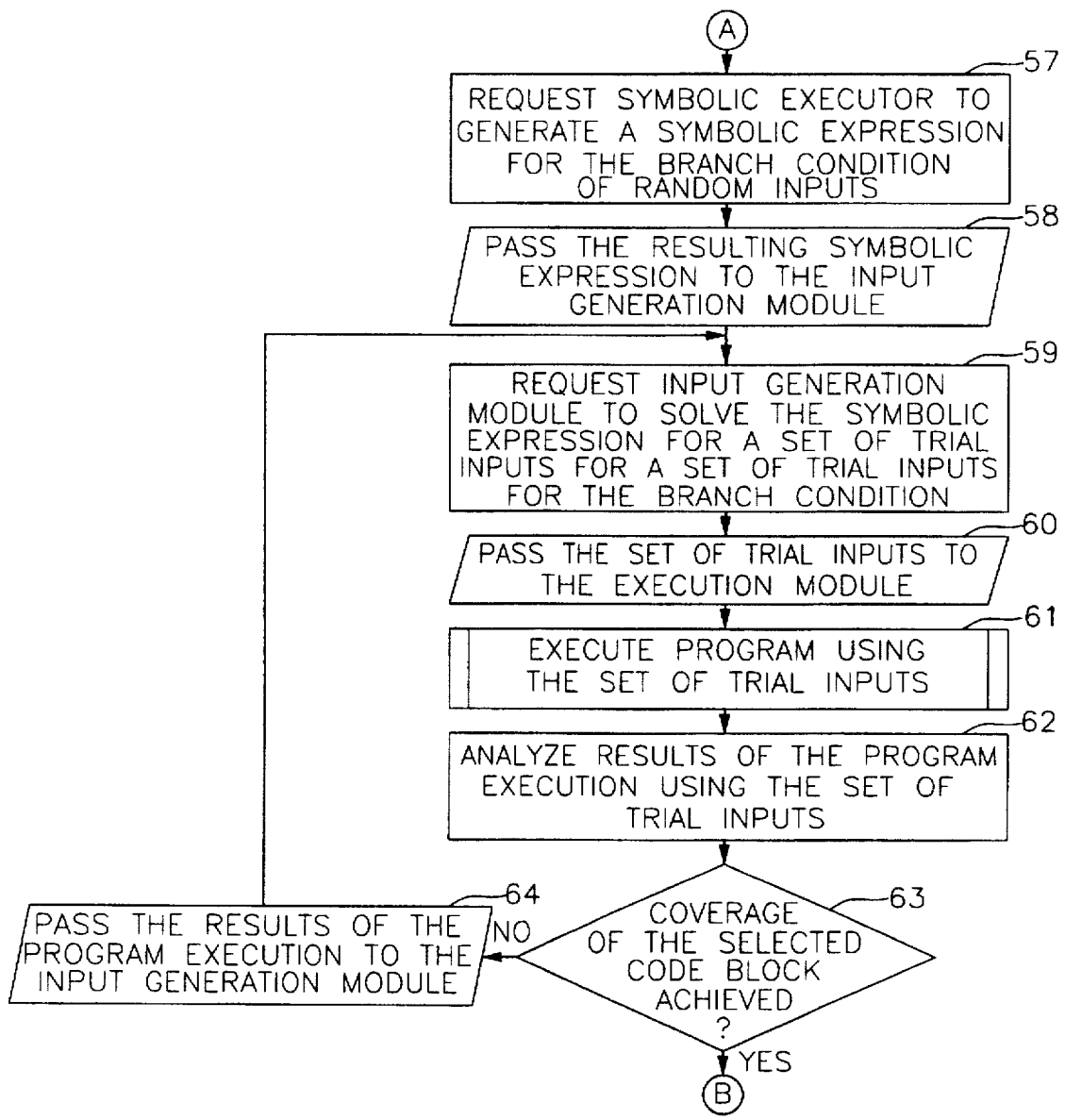
Figure 6C:
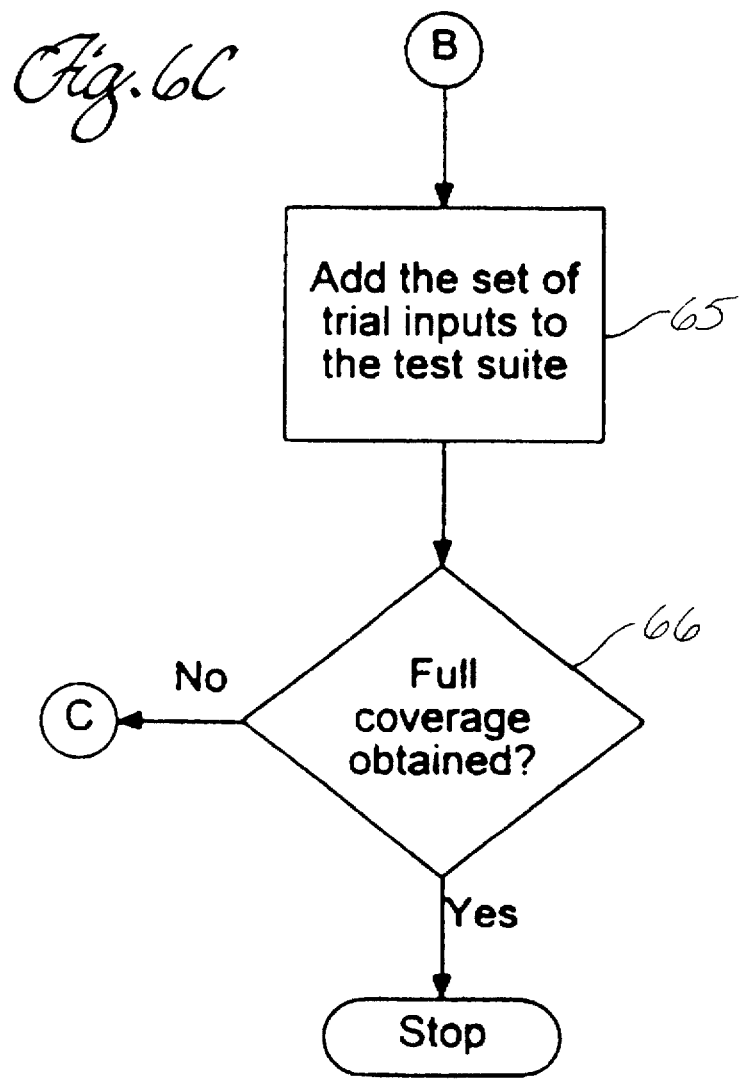

Referring to FIGS. 6A, 6B and 6C, a flow diagram of a method using the TGS driver program 26 for generating a computer program test suite in accordance with the present invention is shown. Initially, the TGS driver program 26 generates a random set of inputs 28 providing basic code coverage of the program under test (blocks 51–53). Then, the TGS driver program 26 iteratively processes each of the code blocks in the original source code 11 using a pair of nested control loops. The outer control loop (blocks 54–66) iterates until coverage of substantially every code block has been obtained. The inner control loop (blocks 59–63) iterates until a set of inputs 28 has been found that covers a selected individual code block.

Upon invocation of the TGS program driver 26, the decision module 41 reads the program database 21 to obtain the parse tree and information regarding the program under test (block 50). The decision module 41 requests the input generation module 43 to create a trial set of inputs 28 using the random input generation module 71 (block 51) as further described hereinbelow in FIG. 7.

Once a random set of inputs 28 has been generated, the execution module 40 executes the instrumented object code 25 using the random set of inputs 28 (block 52) per instructions from the decision module 41. Only independent random sets of inputs 28 are added to the test suite database 12 (block 53). These are sets of inputs 28 that result in code coverage different from that obtained with any of the other sets of inputs 28 already present in the test suite database 12.

A flow into one of the code blocks of the instrumented source code 22 is selected by the decision module 41 (block 54). The goal of this step is to identify a code block in the original source code 21 not covered by one of the sets of inputs 28 currently in the test suite database 12. If the selected code block is covered by one of the sets of inputs 28 currently in the test suite database 12 (block 55), a new code block is selected (block 54). Otherwise, if the selected code block is not covered (block 55), the decision module 41 identifies the branch condition controlling the execution of that code block (block 56) using the parse tree stored in the program database 21.

The decision module 41 requests the symbolic execution module 42 to generate a symbolic expression for the branch condition (block 57) as further described hereinbelow in FIG. 14. The resulting symbolic expression is passed to the input generation module 43 by the decision module 41 (block 58). The decision module 41 requests the input generation module 43 to solve the symbolic expression for a trial set of inputs 28 that satisfy the identified branch condition (block 59).

The decision module 41 passes the trial set of inputs 28 to the execution module 40 (block 60) which executes the instrumented object code 25 using that trial set of inputs 28 (block 61). The execution module 40 analyzes the results of the execution run and passes back those results to the decision module 41 (block 62).

If coverage of the selected code block has not been achieved by using the trial set of inputs 28 as determined by the execution module 40 (block 63), the results of the execution run by the execution module 40 are passed to the input generation module 43 (block 64) for use in the generation of another trial set of inputs 28 (block 59) at the top of the inner control loop (blocks 59–63). Otherwise, if coverage of the selected code block has been achieved (block 63), the trial set of inputs 28 is added to the test suite database 12 (block 65).

If full coverage of substantially all code blocks in the program under test has not been obtained (block 66), control returns to the top of the outer control loop (blocks 54–66) for selection of another code block not already covered by one of the sets of inputs 28 currently in the test suite database 12. Otherwise, if full coverage has been obtained (block 66), the TGS driver program 26 terminates since it is no longer necessary to generate further sets of inputs 28.

III. Input Generation Modules

A. Structure

Referring to FIG. 7, a functional block diagram of the input generation module 43 is shown. It operates in response to a request for a trial set of inputs 28 from the decision module 41 (block 70). The input generation module 43 comprises four submodules: random input generation module 71, solver module 72, guided function minimization (GFM) module 73 and heuristics module 74. The random input generation module 71 generates a set of random inputs using a pseudo random number generator, such as described in D.C. Ince, *The Automatic Generation of Test Data*, 30 The Computer Journal 1, pp. 63–69 (1987), the disclosure of which is incorporated herein by reference.

The heuristics module 74 contains a set of rules (not shown) that can be invoked by the random input generation module 71 to generate a random input chosen in such a way that the input has an increased chance of forcing more coverage of the program under test.

The solver module 72 generates an input for solving a specific symbolic expression in response to the decision module 41 which passes the symbolic expression as an input parameter to the input generation module 43. The solver module 72 finds an input that solves the specific symbolic expression for a path condition that leads to a desired branch of the currently selected code block.

The GFM module 73 enables the TGS 10 to solve for an input using guided function minimization methods, such as described in B. Korel, *Automated Software Test Data Generation*, 16 IEEE Trans. on Software Engineering 8, pp. 870–879 (1990), the disclosure of which is incorporated herein by reference. These methods avoid requiring knowledge of the functional form of the equation to be solved and only require that the output be calculable for any given input. The GFM module 73 is used in two cases. First, the solver module 72 uses the GFM module 73 to find a solution for a symbolic expression too complicated for it to solve itself. Second, the decision module 41 uses the GFM module 73 for finding an input when no symbolic expression can be calculated for the desired code branch. In the latter case, the functional form for the dependence of the branch condition on its inputs is unknown. Consequently, the program under test must be repeatedly executed to determine what values the branch condition takes on for different inputs.

Upon the generation of a trial set of inputs 28, the input generation module 43 outputs from the appropriate submodule (block 75) the trial set of inputs 28 into the test suit database 12 along with a corresponding input description file 27.

Referring to FIGS. 8A and 8B, a collection of input files 76a, 76b, 76c containing, by way of example, sets of inputs 28 and a collection of files 77a, 77b, 77c containing corresponding input description files 27 generated by the TGS 10 for the original computer program of FIG. 4A are shown. In the examples shown, each set of inputs 28 contains a single value which is an input to the program statement "c=getchar ( );" in line 5 of FIG. 4A. For instance, the input file 76a contains Input Set #1 comprising an input character "j." However, other computer programs requiring several input values would have a set of inputs 28 containing one value per input program statement.

Each input description file 27 contains detailed information about the type of input generated and the statement in the original source code 11 to which it corresponds. For instance, the file 77a contains Input Description File #1 comprising "1–[0\2]: size=4, value=106 'j'." The value "1" indicates the block number corresponding to that input value. The "[0\2]" value is a key into the program database 21 indicating the statement that generated that input in the original source code 11. The size field indicates the size in bytes of the input generated. The value field indicates the value generated and corresponds to one of the set of inputs 28 contained in the corresponding input file 76a, 76b, 76c.

B. Operation

Figure 9:
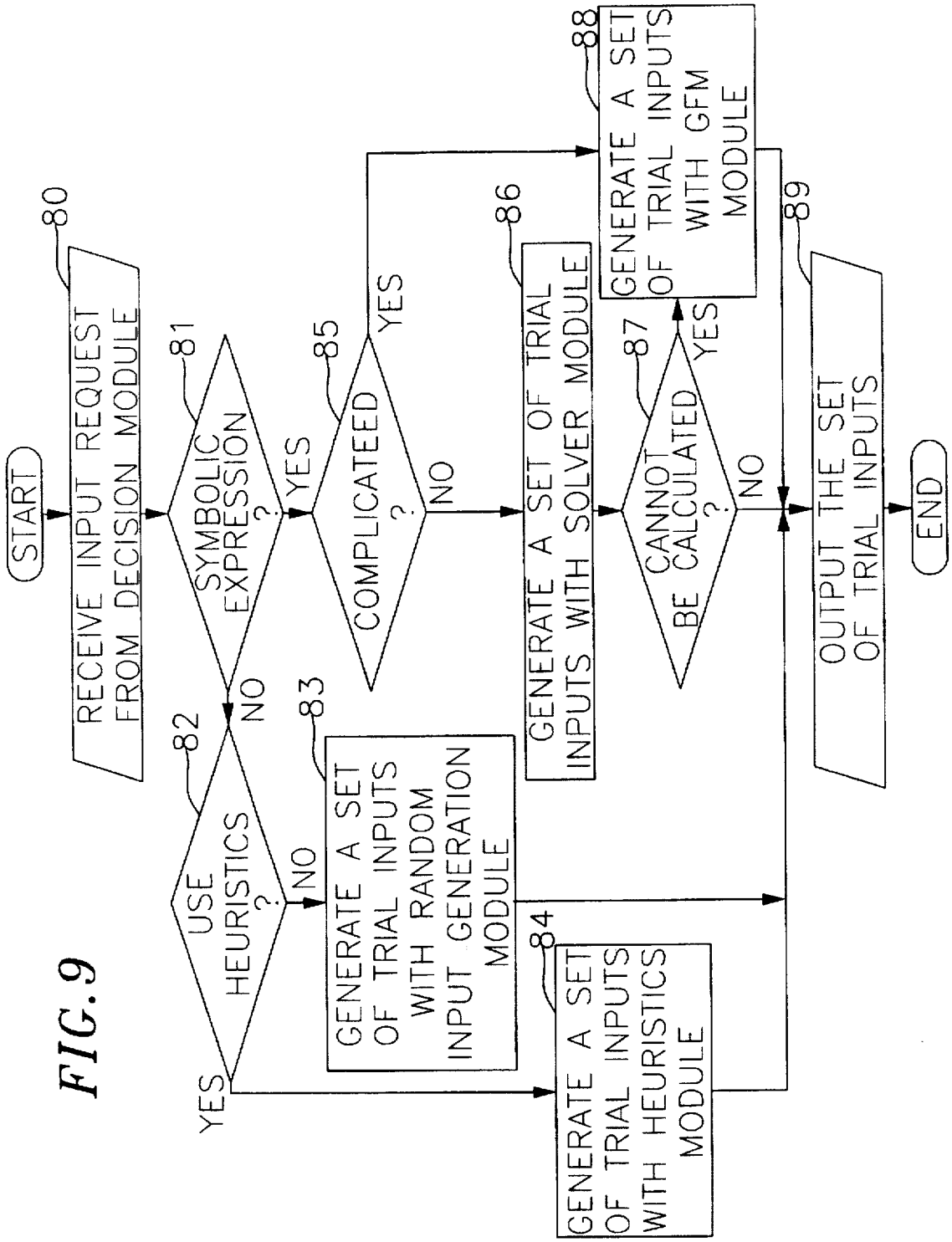
FIG. 9 is a flow diagram of a function for processing an input request using the input generation module of FIG. 5.

Referring to FIG. 9, a flow diagram for a function for processing an input request using the input generation module 43 is shown. An input request is received by the input generation module 43 from the decision module 41 (block 80). If the input request is not for an input satisfying a symbolic expression (block 81), two paths can be taken. First, if the use of heuristics is not specified (block 82), a trial set of inputs 28 is generated by the random input generation module 71 (block 83). Otherwise, if the use of heuristics is specified (block 82), a trial set of inputs 28 is generated by the heuristics module 74 (block 84).

If the input request is for an input satisfying a symbolic expression (block 81) yet the symbolic expression is not complicated (block 85), a trial set of inputs 28 is generated by the solver module 72 (block 86). However, if the solver module 72 is unable to calculate a solution (block 87), the solver module 72 forwards the input request to the GFM module 73 which will generate a trial set of inputs 28 based on that symbolic expression (block 88).

Once a trial set of inputs 28 has been generated by one of the submodules comprising the input generation module 43 (blocks 83, 84, 86, 88), the trial set of inputs 28 is output into the test suite database 12 along with a corresponding input description file 27 (block 89). The function then terminates.

IV. Symbolic Execution Module

A. Overview

Figure 10:
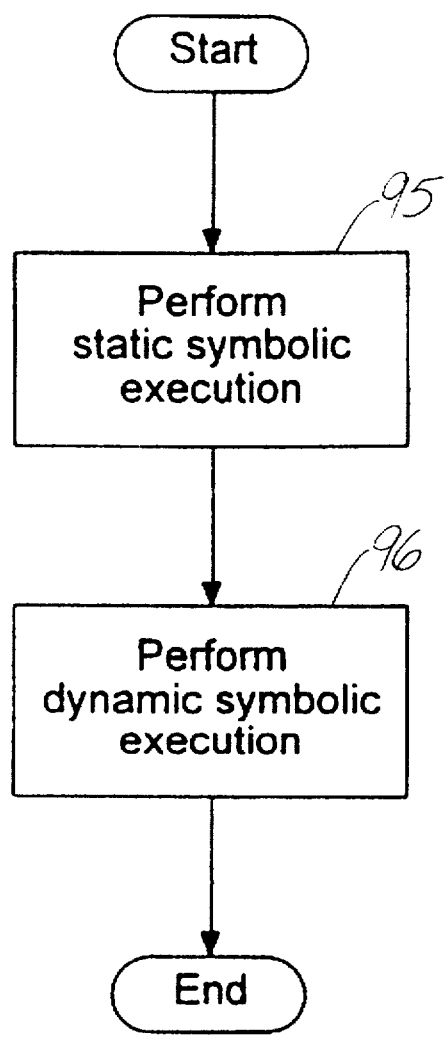
FIG. 10 is a flow diagram of a function for generating a symbolic expression in accordance with the present invention.

The use of a trial set of inputs 28 based solely on pseudo random numbers is insufficient in most cases for obtaining full branch code coverage. Consequently, the present invention employs symbolic execution to generate a symbolic expression that fully describes the dependence of the branch condition on the inputs of the program under test as follows with reference to FIG. 10 which is a flow diagram of a function for generating a symbolic expression in accordance with the present invention.

First, a static symbolic execution is performed for the complete program (block 95). This static symbolic execution consists of a single sweep over the full program and generates a symbolic expression for a few of the path conditions. This static symbolic execution only gives a symbolic expression for those branch conditions that have a simple dependence on the inputs to the program under test. Consequently, static symbolic execution is useful only for those programs not having an appreciable size.

It is important to generate a symbolic expression for as many branch conditions in the program under test as possible. To do this, dynamic symbolic execution is performed (block 96) as further described hereinbelow in FIG. 13. A dynamic symbolic execution is like a normal interpretation of the program under test but uses symbolic values for the inputs to the program instead of actual values.

The dynamic symbolic execution is performed along the path taken by an actual execution of the program under test which corresponds to some set of inputs 28 in the test suite database 12. Symbolic expressions can then be used to generate new sets of inputs 28 based on those existing sets of inputs 28 and chosen in such a way as to increase the coverage of the test suite database 12.

B. Structure

Figure 11:
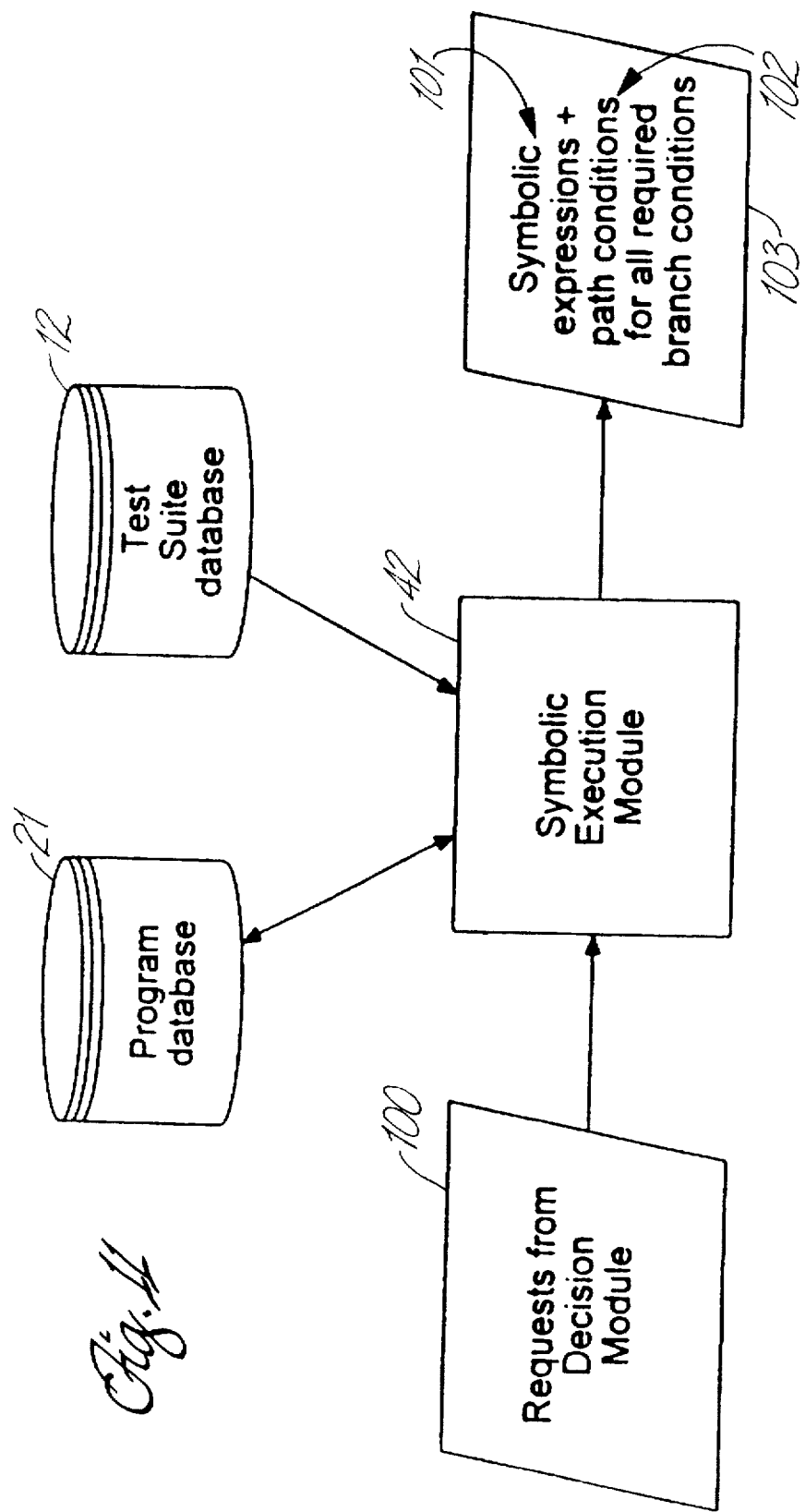
FIG. 11 is a functional block diagram of the symbolic execution module of FIG. 5.

Referring to FIG. 11, a functional block diagram of the symbolic execution module 42 of FIG. 5 is shown. The purpose of the symbolic execution module 42 is to perform a symbolic execution of the program under test. Requests for symbolic executions are received from the decision module 41 (block 100). The symbolic execution module 42 symbolically interprets the program under test using information stored in the program database 21 and the test suite database 12. Upon completion, symbolic expressions 101 and associated path conditions 102 are output by the symbolic execution module 42 for all required branch conditions (block 103).

Figure 12:
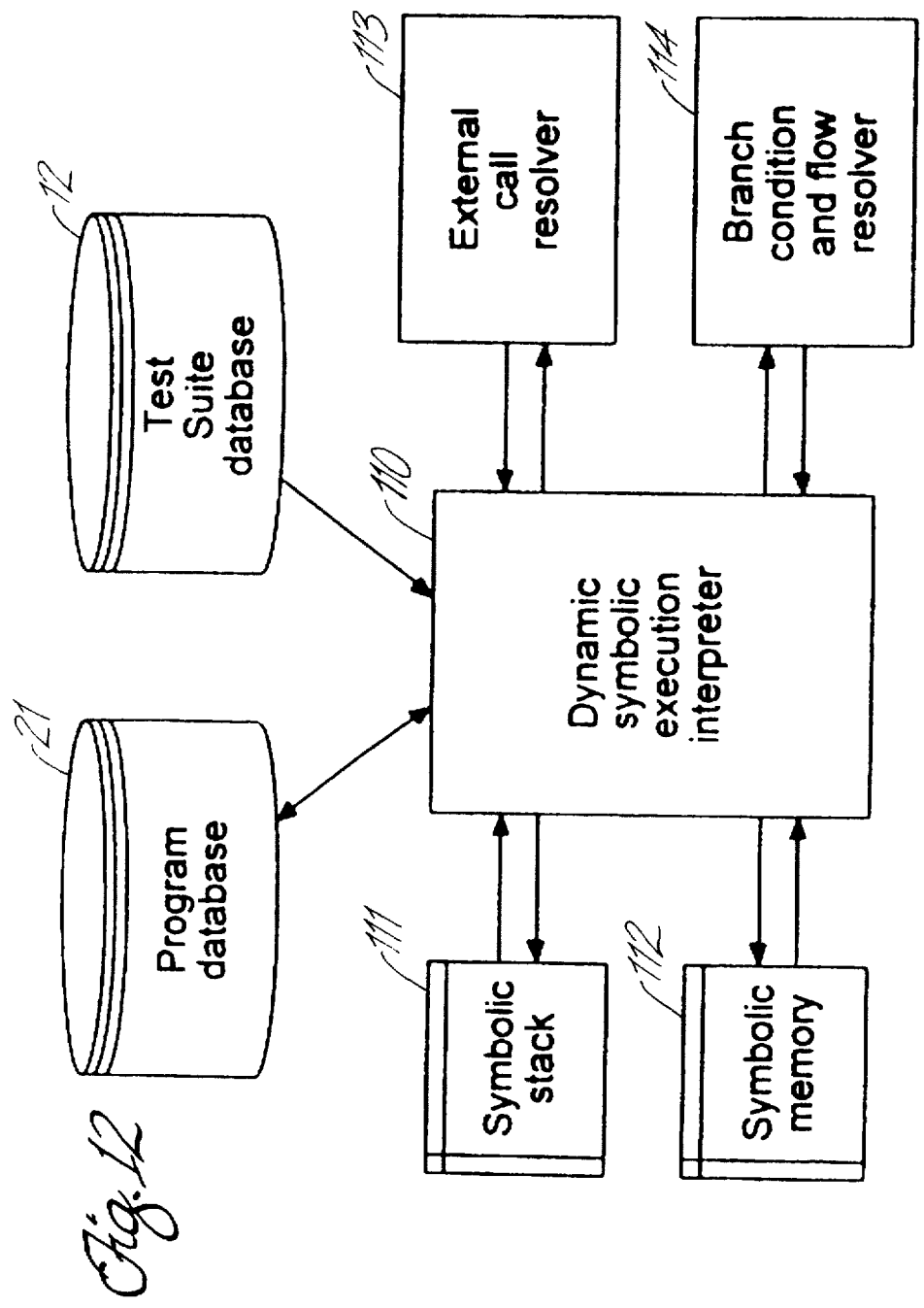
FIG. 12 is a functional block diagram of the components comprising the symbolic execution module of FIG. 5.

FIG. 12 is a functional block diagram of the five components comprising the symbolic execution module 42 of FIG. 5. The components include: dynamic symbolic execution interpreter 110; symbolic stack 111; symbolic memory 112; external call resolver 113; and branch condition and flow resolver 114.

The dynamic symbolic execution interpreter 110 is the main component coordinating the dynamic symbolic execution of the program under test. It performs a function similar to an interpreter but instead of assigning real values to each program variable, it assigns symbolic values to each program variable. Symbolic values are expressions expressed as a function of the inputs to the program under test as further described hereinbelow in Section V. The dynamic symbolic execution interpreter 110 symbolically executes the program under test using a parse tree, such as shown in FIG. 2B, stored in the program database 21 and the sets of inputs 28 and flow and coverage information 29 stored in the test suite database 12.

The dynamic symbolic execution interpreter 110 employs two temporary memories: symbolic stack 111 and symbolic memory 112. The symbolic stack 111 is a pushdown stack as conventional in the art used for storing the activation records (not shown) for currently called functions. The symbolic memory 112 stores all values used by the program under test as input variables and program variables in symbolic form, as further described hereinbelow in Section V.

The dynamic symbolic execution interpreter 110 employs for performing specialized functions: external call resolver 113 and branch condition and flow resolver 114. The external call resolver 113, further described hereinbelow in FIG. 15, handles all function calls whose source code is not contained as a part of the original source code 11. These include, for instance, system calls and calls to external function libraries. The branch condition and flow resolver 114, further described hereinbelow in FIG. 14, determines the next program instruction to be executed based on information on actual execution runs stored in the test suite database 12.

C. Operation

Figure 13:
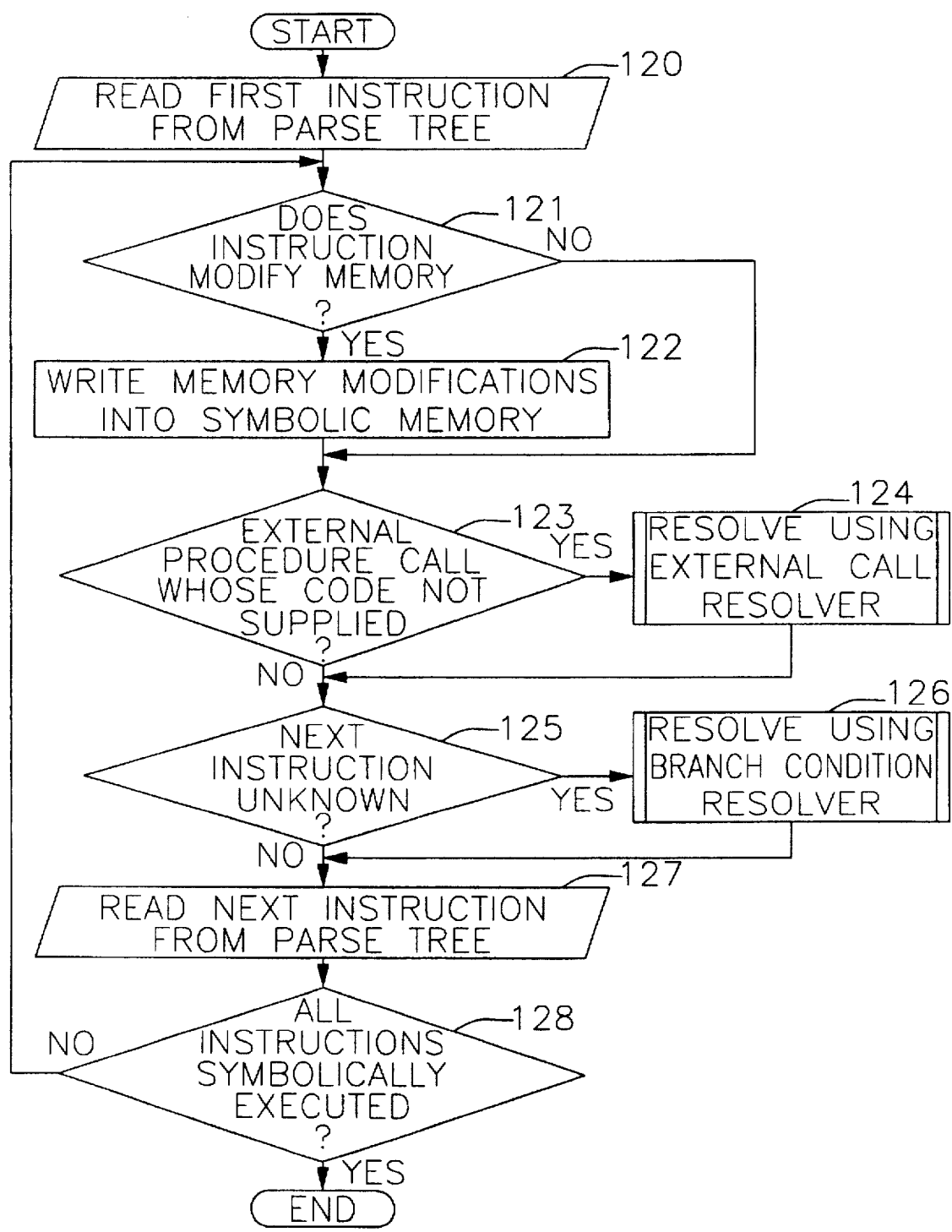
FIG. 13 is a flow diagram of a method for performing dynamic symbolic execution in accordance with the present invention.

FIG. 13 is a flow diagram of a method for performing dynamic symbolic execution using the symbolic execution module 42 of FIG. 5, in accordance with the present invention. The dynamic symbolic execution interpreter 110 controls all symbolic execution. Preferably, the dynamic symbolic execution interpreter 110 discriminates between different program instructions and skips certain instructions for efficiency and time savings. This includes those time-consuming parts of the program under test that do not influence branch conditions of interest. The dynamic symbolic execution interpreter 110 symbolically executes the entire program under test even though non-dependent instructions are skipped for optimization (not shown). Dynamic symbolic execution is performed as follows with reference to the original computer program of FIG. 4A and its corresponding parse tree of FIG. 2B.

The dynamic symbolic execution interpreter 110 iteratively processes (blocks 121–128) the instructions comprising the program under test using a parse tree representation, such as the parse tree shown in FIG. 2B. The dynamic symbolic execution interpreter 110 begins by reading the first instruction from the parse tree (block 120). If the instruction modifies a memory location in a memory used by the program under test to store and retrieve data values (block 121), the memory modifications are written into the symbolic memory 112 in symbolic form (block 122). For example, in line 5 of FIG. 4A, the program statement "c=getchar ( );" is an assignment statement that assigns an input character obtained using the function getchar that is stored in the program variable c. Thus, this instruction modifies the memory of the program under test. The memory modification is expressed in symbolic form in the symbolic memory 112 as the statement "c=<int> <1–[0\2]>"

where <int> indicates that the symbolic value for the program variable c is an integer and <1−[0\2]> is a key for an entry stored in the symbolic memory 112 representing the current input value.

If the original source code 11 includes an external procedure call whose source code is not supplied in the original source code 11 (block 123), that is, its program statements are unknown, the dynamic symbolic execution interpreter 110 calls the external call resolver 113 to resolve the symbolic expression (block 124), as further described hereinbelow in FIG. 15. This step is necessary because the parse tree only contains nodes corresponding to program statements supplied in the original source code 11. Thus, there are no nodes in the parse tree corresponding to external procedure calls whose source code is not supplied and consequently the dynamic symbolic execution interpreter 110 needs some procedure for symbolically executing these functions.

The dynamic symbolic execution interpreter 110 attempts to symbolically execute each instruction in the program under test in sequence. However, certain types of instructions cause a branch in the control flow and thereby make the next instruction unknown. For instance, conditional instructions, such as if or switch statements, or a loop condition test, such as in for or while statements, will cause a break in the control flow. Thus, if the next program instruction is unknown (block 125), the branch condition and flow resolver 114 is called by the dynamic symbolic execution interpreter 110 to resolve the next instruction to be performed (block 126), as further described hereinbelow in FIG. 14.

Once the next program instruction is known, the dynamic symbolic execution interpreter 110 reads that instruction from the parse tree (block 127). If all program instructions have not been symbolically executed (block 120), control returns to the top of the control loop (blocks 120–121) for processing of the next program instruction. Otherwise, the program ends.

Figure 14:
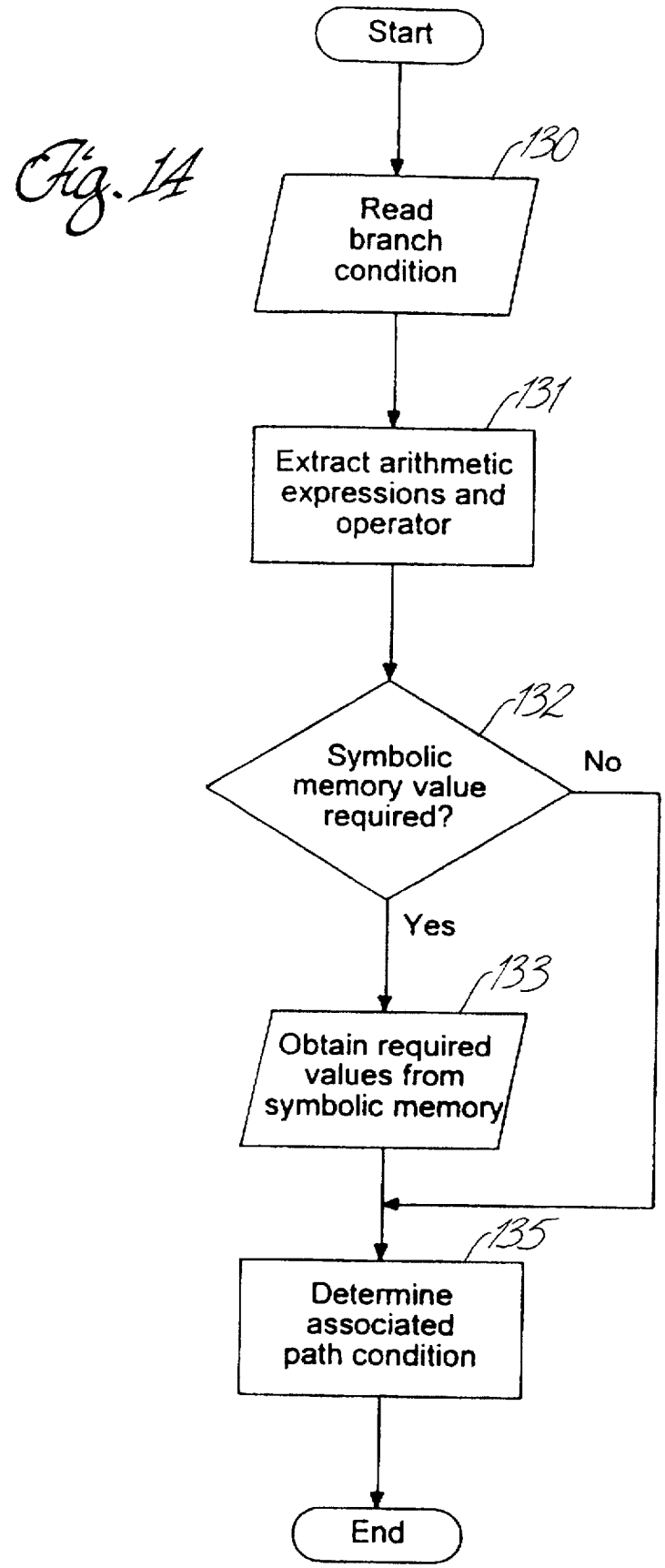
FIG. 14 is a flow diagram of a function for resolving a branch condition.

FIG. 14 is a flow diagram of a function for resolving a branch condition using the branch condition and flow resolver 114 of FIG. 12. Its purpose is to generate a symbolic expression 101 and a corresponding path condition 102 for the branch condition being resolved.

The branch condition is read by the branch condition and flow resolver 114 (block 130) and arithmetic expressions and an operator are extracted from the branch condition (block 131). For example, in line 9 of FIG. 4A, the branch condition in the program statement "else if (c=='b')" contains two arithmetic expressions, c and 'b', and one operator, the equality operator ==.

The branch condition and flow resolver 114 then examines each of the arithmetic operators to determine whether a symbolic memory value is required (block 132)and if so, obtains it from the symbolic memory 112 (block 133). In this example, the program variable c requires a symbolic memory value and the corresponding symbolic memory value <int> <1−[0\2]> is obtained from the symbolic memory 112. The arithmetic expression corresponding to the character constant 'b' does not require a symbolic memory value.

The main purpose of the branch condition and flow resolver 114 is to determine the next instruction that needs to be executed in case the dynamic symbolic execution interpreter 110 cannot calculate the value of the symbolic expression. This can happen, for example, if certain calculations have been skipped for optimization purposes.

If a symbolic expression for a branch condition can be calculated, the dynamic symbolic execution interpreter 110 will just calculate the next instruction to be executed by replacing the symbolic inputs with the actual inputs to the symbolic expression.

The branch condition and flow resolver 114 can also calculate the next instruction to be executed by looking at the actual flow of the program under test. If an actual execution corresponding to some set of inputs 28 in the test suite database 12 is being followed, the corresponding flow and coverage information 29 for that set of inputs 28 can be used to decide which statement to execute next.

Figure 15:
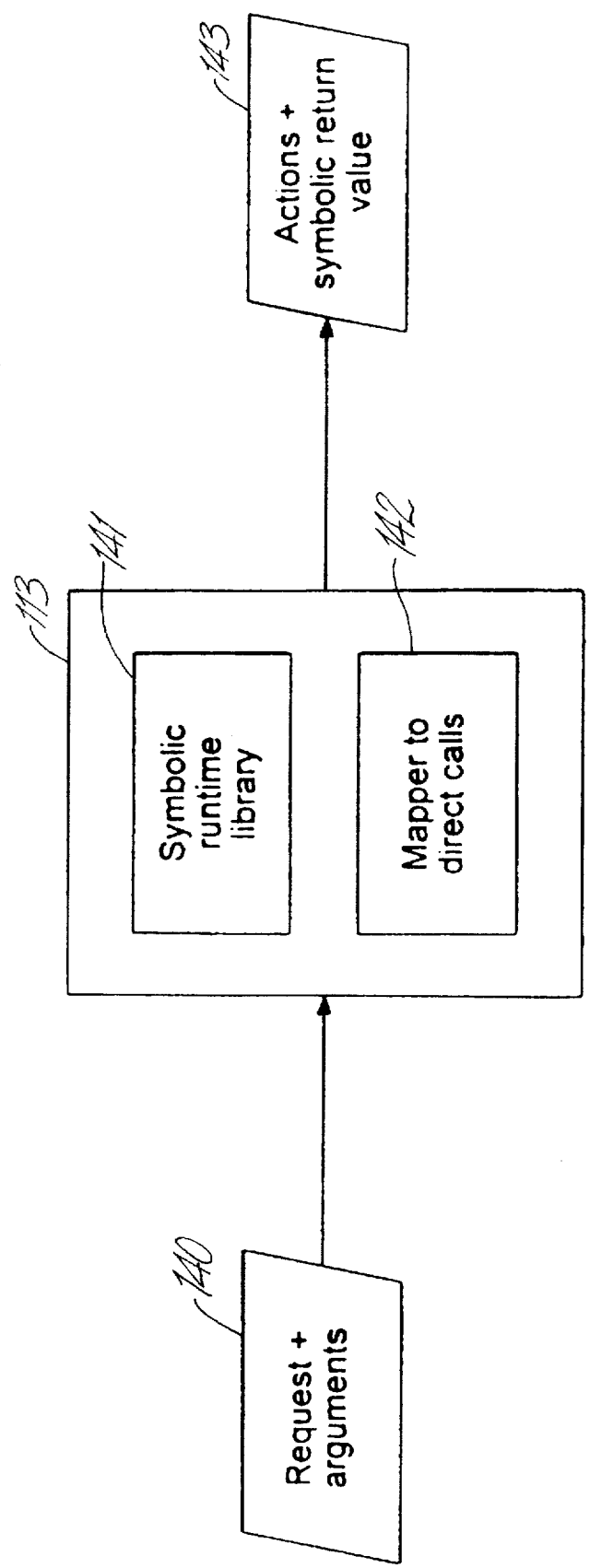
FIG. 15 is a functional block diagram of the external call resolver of FIG. 12.

FIG. 15 is a functional block diagram of the external call resolver 113. This module is used by the dynamic symbolic execution interpreter 110 whenever the parse tree for the program under test does not contain nodes corresponding to an external procedure call made in the original source code 11. The external call resolver 113 employs two methods using an internal symbolic run-time library 141 and a mapper to direct calls 142.

In operation, the external call resolver 113 receives a request for an external procedure call resolution with its input arguments (block 140). It determines the actions that the procedure call takes and returns the symbolic memory values mapped into the symbolic memory 112 (block 143).

The internal symbolic run-time library 141 contains commonly used functions, such as system calls and calls to external function libraries. It works with symbolic memory values stored in the symbolic memory 112. The internal symbolic run-time library 141 produces a symbolic expression that replaces the received input arguments with their corresponding symbolic memory values and the external procedure call with its matching commonly used function from the internal symbolic run-time library 141. The symbolic expression is returned to the dynamic symbolic execution interpreter 110.

The mapper to direct calls 142 maps symbolic input arguments for an external procedure to actual non-symbolic arguments (not shown) and calls the actual procedure for execution. The returned values from the actual procedure call are mapped back to their respective symbolic memory values in the symbolic memory 112 and are returned to the dynamic symbolic execution interpreter 110.

V. Symbolic Memory

The symbolic memory 112 stores symbolic memory values corresponding to actual program values used in the program under test. It employs the same format as used for a parse tree, such as the parse tree shown in FIG. 2A. Four additional nodes are used: TGS_NODE, TGS_MEMORY, TGS_RT_POINTER and TGS_CELL. Each item in the symbolic memory 112 corresponding to an input of the program is identified by a unique key, such as the key "1−[0\2]"shown in the input description file 77a of FIG. 8B. Unique keys are assigned to all input statements.

A memory location in the symbolic memory 112 consists of two items: type information for identifying the type of data stored, e.g., integer data, and the symbolic value itself. The latter is stored as a subtree.

The types of representations used for storing actual program values in symbolic form as symbolic memory values in the symbolic memory 112 will now be described.

A. Constant Values

Constant values are represented in the symbolic memory 112 by the same parse tree nodes as used for representing constant values in the original source code 11.

For example, consider the symbolic memory value for a program variable var defined by the program statement:
   int var;

After symbolically executing an assignment statement:

var=5;

var is stored in the symbolic memory 112 as a symbolic program statement:

var=<int>5;

This corresponds to the parse tree nodes:

542-cons.integer=5; type=114;

114--integer <int>

B. Symbolic Expressions Dependent on Input Values

A TGS_NODE node is used in the symbolic memory 112 for representing the dependence of the symbolic memory value on an input value.

For example, consider the symbolic memory value for the program variable var after symbolically executing a scanf program statement:

scanf ("%d", &var);

which assigns an input value to its memory address and after symbolically executing another assignment statement:

var=var+3;

Var is stored in the symbolic memory 112 as a symbolic program statement:

var=<int> [tgs_node]+3;

where [tgs_node] is the TGS_NODE that represents the input value assigned in the scanf program statement. This corresponds to the parse tree nodes:

586-addition type=114; [ ] ops=585; 168;

114--integer<int>

585--tgs_node type=114; [ ] key=2, index=1, elem=-1

168--cons.integer=3; type=114;

C. Arrays

A TGS_MEMORY node is used by the symbolic memory 112 for representing an array. Each TGS_MEMORY node contains a list of cells represented by TGS_CELL nodes. Each cell contains an array index and corresponding value.

For example, consider the symbolic memory value for a program variable arr defined as an array by the program statement:

int arr [5], ind;

After symbolically executing the assignment statements:

arr [1]=10;

arr [2]=20;

and after symbolically executing scanf program statements:

scanf ("%d", &ind);

scanf ("%d", &arr [ind]);

which assign input values to respective memory addresses. Arr is stored in the symbolic memory 112 as symbolic program statements:

```
arr = <int [5]> [20 bytes = 5 cells * 4 bytes]-{
    <int> [1] = <int> 10
    <int> [2] = <int> 20
    <int> [<[0|4]>1 = <int> <[0|6]>
};
```

This corresponds to the parse tree nodes:

601-tgs_memory type=542; sizeof=20 tgs_node=602; [ ] cells=622;

542--array type=114; sizeof=20 max=541;

541---cons.integer=5; type=114; sizeof=4

114----integer <int> sizeof=4

622---tgs_cell index=613; value=623;

D. Structures

Structures are represented in the symbolic memory 112 in a manner similar to that used for arrays. The only difference is that the index used for identifying each cell is replaced by a structure member name.

For example, consider the symbolic memory value for a program variable rec defined as a structure by the program statement:

```
struct {
    int len;
    char *str;
} rec;
```

After symbolically executing the assignment statements:

rec.len=3;

rec.str="abc";

Rec is stored in the symbolic memory 112 as symbolic program statements:

```
rec = <struct { }> [8 bytes]-{
    <int> [len] = <int> 3
    <char *> [str] = <char *> "abc"
}
```

These correspond to the parse tree nodes:

581-tgs_memory type=540; sizeof=8 tgs_node=584; [ ] cells=582;

540--struct name=<null> sizeof =8 fields=542; next=550;

542----field_decl name=len [tst.c:4] type=114; next=545;

114-----integer<int>

545----field_decl name=str [tst.c:5] type=544;

544-----pointer type=110;

110------char

582---tgs_cell index=541; value=168;

541----identifier=len;

168----cons.integer=3; type=114;

583---tgs cell index=543; value=555;

543----identifier=str;

555----cons.string="abc"; type=556;

556-----pointer type=110;

VI. Symbolic Execution of JAVA Programs Using the Test Generation System

A. Test Generation System For Processing JAVA Programs

Figure 16:
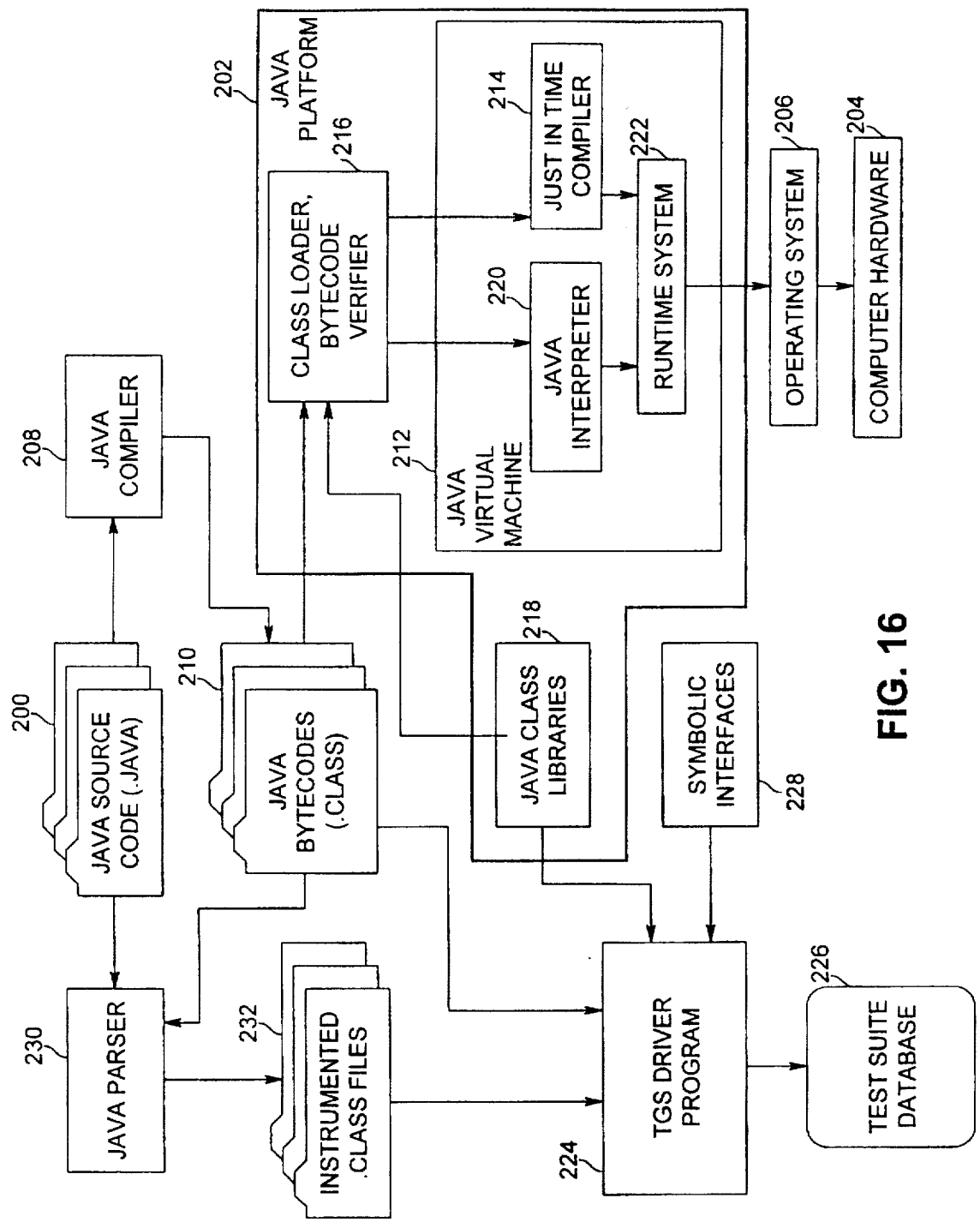
FIG. 16 is a functional block diagram of the test generation system of FIG. 1 as adapted for JAVA programs.

The Test Generation System (TGS) of the present invention may be extended to provide dynamic symbolic execution of computer programs written in the JAVA programming language for use on JAVA platforms. The JAVA language is an object-oriented language that supports dynamic linking and has a class hierarchy with single inheritance. The JAVA programming language is described in *The JAVA Tutorial, Object-Oriented Programming For The Internet*, by Mary Campione and Kathy Walrath, Addison-Wesley, 1996. The JAVA Platform is described in *The JAVA Platform, A White Paper*, by Douglas Kramer, Sun Microsystems, Inc., 1996, the disclosure of which is incorporated by reference. FIG. 16 is a functional block diagram of the test generation system of FIG. 1 as adapted for JAVA programs.

A JAVA Platform is a software platform for delivering and running highly interactive, dynamic, and secure applets and applications on networked computer systems. Applets are programs that require a browser program to run. An <applet> tag is embedded in a World Wide Web (WWW) hyper-text markup language (HTML) file and identifies a program to be run. When that file (i.e., that page) is accessed by a user, either over the Internet or a corporate intranet, the applet automatically downloads from a server and runs on the client system. Applications are computer programs that do not require a browser to run and have no built-in downloading mechanism. When an application is called, it is executed. Applications perform traditional desktop tasks, such as word processing, spreadsheet, or graphics applications, and games. Applets and applications originate as JAVA source code files 200. These JAVA source code files have a ".java" suffix.

The JAVA Platform 202 is represented by a runtime environment and resides on computer hardware 204 above other computer operating systems 206 such as WINDOWS from Microsoft Corporation, MACINTOSH from Apple Computer, Inc., OS/2 from International Business Machines Corporation, UNIX, and NETWARE from Novell, Inc. Software developers use the JAVA language to write JAVA source code 200 for JAVA-powered applications and applets. The source code is compiled once to the JAVA Platform 202, rather than to the underlying system. The source code is compiled by JAVA compiler 208 into intermediate, portable "bytecodes" 210, which are not specific to any physical machine, but are machine instructions for a virtual machine. A computer program written in the JAVA language compiles to a bytecode file 210 that can run wherever the JAVA Platform 202 is present, on any underlying operating system software. This portability is made possible because at the core of the JAVA Platform is the JAVA Virtual Machine 212, and each underlying platform has its own implementation of the JAVA Virtual Machine based on a single virtual machine specification. The JAVA Virtual Machine 212 is a "soft" computer that can be implemented in software or hardware. It is an abstract machine designed to be implemented on top of existing platforms. A porting interface and adapters (not shown) are included to enable it to be easily ported to new operating systems without being completely rewritten.

The JAVA Virtual Machine defines a machine-independent format for binary files called the class (.class) file format. This format includes instructions for a virtual computer system in the form of bytecodes 210. The bytecode representation of any JAVA language program is symbolic in the sense that offsets and indexes into methods are not constants, but are represented as string names. The first time a method is called, it is searched by name in the class file format, and its offset numeric value is determined at that time for quicker subsequent access. Therefore, any new or overriding method can be introduced late at runtime anywhere in the class structure, and it will be referred to symbolically, and properly accessed without causing errors in the code. The bytecodes are a relatively high-level representation of the source code so that some optimization and machine code generation (via a just-in-time compiler 214) can be performed at that level. The JAVA Bytecodes 210 and JAVA Class Libraries 218 are passed to Class Loader and Bytecode Verifier 216 for loading into memory and for verification of security before they enter the JAVA Virtual Machine. In addition, garbage collection can occur inside the JAVA Virtual Machine, since it holds variables in stacks in the JAVA Platform address space. Once in the JAVA Virtual Machine, the bytecodes are interpreted by JAVA Interpreter 220, or optionally turned into machine code by the Just-In-Time Compiler 214. The JAVA Interpreter and Just-In-Time Compiler operate in the context of a Runtime System 222.

The TGS as described in FIGS. 1–16 above provides the capability to symbolically interpret a program in order to get symbolic information about the values of the program variables at any given point of execution. With normal interpretation, one has the value of the variables at each point of the program. With symbolic execution, one also has the information on how that value depends on the inputs to the program. This extra information that symbolic execution gives can be used for various testing purposes. For example, the information can be used to find inputs to the program for complete test coverage. This can be accomplished because with symbolic execution, the symbolic expressions for branch conditions in the program are known. Thus, inputs to force execution of different branch paths can be determined. Additionally, the information can be used to find inputs that create errors in the program (i.e., errors generating core dumps or runtime exceptions). For example, at any given point in the program, a check can be made if there is a value for a variable that causes an exception (for example, a divide by zero error). Since the symbolic expression for the variable is known, the input value that will make the variable take the value causing the exception can be determined.

The TGS can also be applied as a symbolic interpreter to find inputs that will cause a JAVA program to generate exceptions at runtime. A user supplies the JAVA bytecode .class files 210 generated from the JAVA source code 200 by the JAVA compiler 208 to a TGS Driver Program 224. The input file is specified as the name of the compiled JAVA class that contains the main method. The TGS Driver Program 224 reads the bytecodes, symbolically interprets them and notifies the user of any possible runtime exceptions that the JAVA program may have. To perform the symbolic interpretation, TGS Driver Program 224 needs the JAVA class libraries 218 to resolve any external references in the .class files. These class libraries may be the standard libraries that come with the JAVA compiler or other libraries that the user requires for the JAVA source code 200. Symbolic interfaces 228 contain interfaces that specify to TGS what methods in the libraries produce symbolic values. The TGS Driver Program 224 analyzes the symbolic expressions generated during the symbolic execution and finds out if there are input values that would satisfy specific criteria for those values. Specific criteria (for example, forcing a program branch to be taken or that an exception is thrown) corresponds to the symbolic expressions taking specific values. The TGS Driver Program 224 determines if there are input values that would force the symbolic expressions to take those values and, if so, adds those input values that satisfy the criteria to the Test Suite Database 226. The Test Suite Database stores input values determined by the TGS Driver Program, including input description files. The input values are stored in the Test Suite Database 226 along with information of what criteria they satisfy. The user of the TGS can make use of this information to correct the JAVA program.

Optionally, and if the JAVA source code for a class file is available, JAVA Parser 230 analyzes the source code and instruments the .class file. JAVA Parser 230 analyzes the original source code and writes any additional information needed by the TGS Driver Program into the class files as extra attributes. It also does any bytecode instrumentation the TGS Driver Program may require. The output of the JAVA Parser 230 are Instrumented .Class Files 232. The TGS Driver Program 224 can also work with just the .class files containing the JAVA Bytecodes 210. The complete JAVA applet or application can be tested, including any libraries used, with or without instrumentation.

B. TGS Driver Program Structure and Operation for JAVA programs

Figure 17:
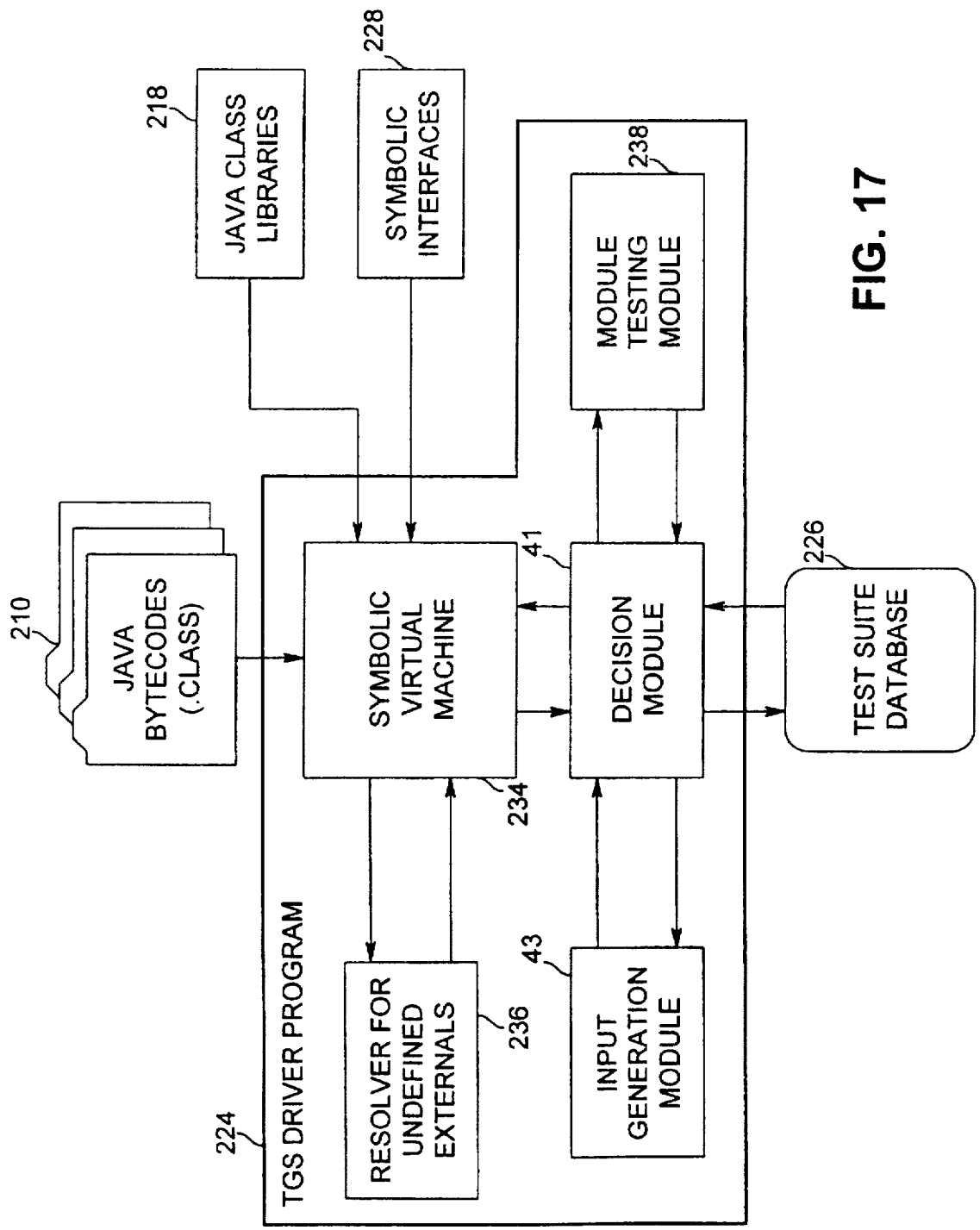
FIG. 17 is a functional block diagram of the TGS Driver Program for operating on JAVA bytecodes.

FIG. 17 is a functional block diagram of the TGS Driver Program for operating on JAVA bytecodes. The Symbolic Virtual Machine (SVM) 234 performs both a normal and a symbolic execution of the JAVA program represented by the JAVA bytecodes 210. In this embodiment, the JAVA bytecodes replace the instrumented object code 25 and the SVM 234 replaces the Execution Module 40 and Symbolic Execution Module 42 of FIG. 5. The SVM 234 reads the .class files and performs normal and symbolic execution by having both normal (numeric) stacks and symbolic stacks in the virtual machine. Interfaces to the JAVA Class Libraries 218 specify what symbolic values correspond to specific calls to the library routines. That is, the library interfaces tell the SVM which functions depend on input parameters and how the input is used. The symbolic values are used for both forcing all branches in the JAVA program so that as much as possible of the program is covered, and for looking for exceptions that can happen at each step in the execution of the program and checking if there are input values that will cause those exceptions. If such input values are found, the user is notified that an exception can occur at a specific point in the program and what inputs will generate the exception. Input can includes all forms of input data, such as text input, graphical input, network input, etc.

The JAVA Class Libraries 218 are libraries existing in the standard JAVA system. The SVM needs access to them in the same way a standard non-symbolic JAVA Virtual Machine needs access to them. Symbolic Interfaces 228 are needed by the SVM 234 to perform symbolic interpretation. The Decision Module 41 and Input Generation Module 43 operate in the same manner as described above in FIG. 5. The Decision Module uses the symbolic expressions found by the SVM 234 to find inputs that cover more branches of the program and generate runtime exceptions.

Two additional modules are added to the TGS Driver Program 224 in this embodiment. Resolver For Undefined Externals 236 is needed by the SVM 234 to perform module testing and for symbolic interpretation. When an external reference is not found in the JAVA Class Libraries 218, the SVM uses the Resolver For Undefined Externals 236 to handle it. The Decision Module 41 interacts with Module Testing Module (MTM) 238 during module testing. The MTM is responsible for deciding which methods in the module being tested need to be called and the arguments that need to be passed for them. The MTM includes heuristic rules for deciding which input values an external reference to the module under test would be able to generate. It also allows the user to specify characteristics about the inputs to the module under test (for example, the range of values a given input variable can take). Details of the MTM are described below in reference to FIG. 22.

The SVM 234 performs symbolic execution of the JAVA program according to commands received from the Decision Module 41. The Decision Module gets the symbolic expressions calculated by the SVM and passes them to the Input Generation Module to find out specific inputs that satisfy the desired criteria. The inputs found this way are stored in the Test Suite Database 226. The Decision Module 41 uses the information in the Test Suite Database to identify which additional criteria needs to be satisfied. It then instructs the SVM to perform specific symbolic executions that will produce symbolic expressions used to find input values satisfying the specified criteria.

Figure 18A:
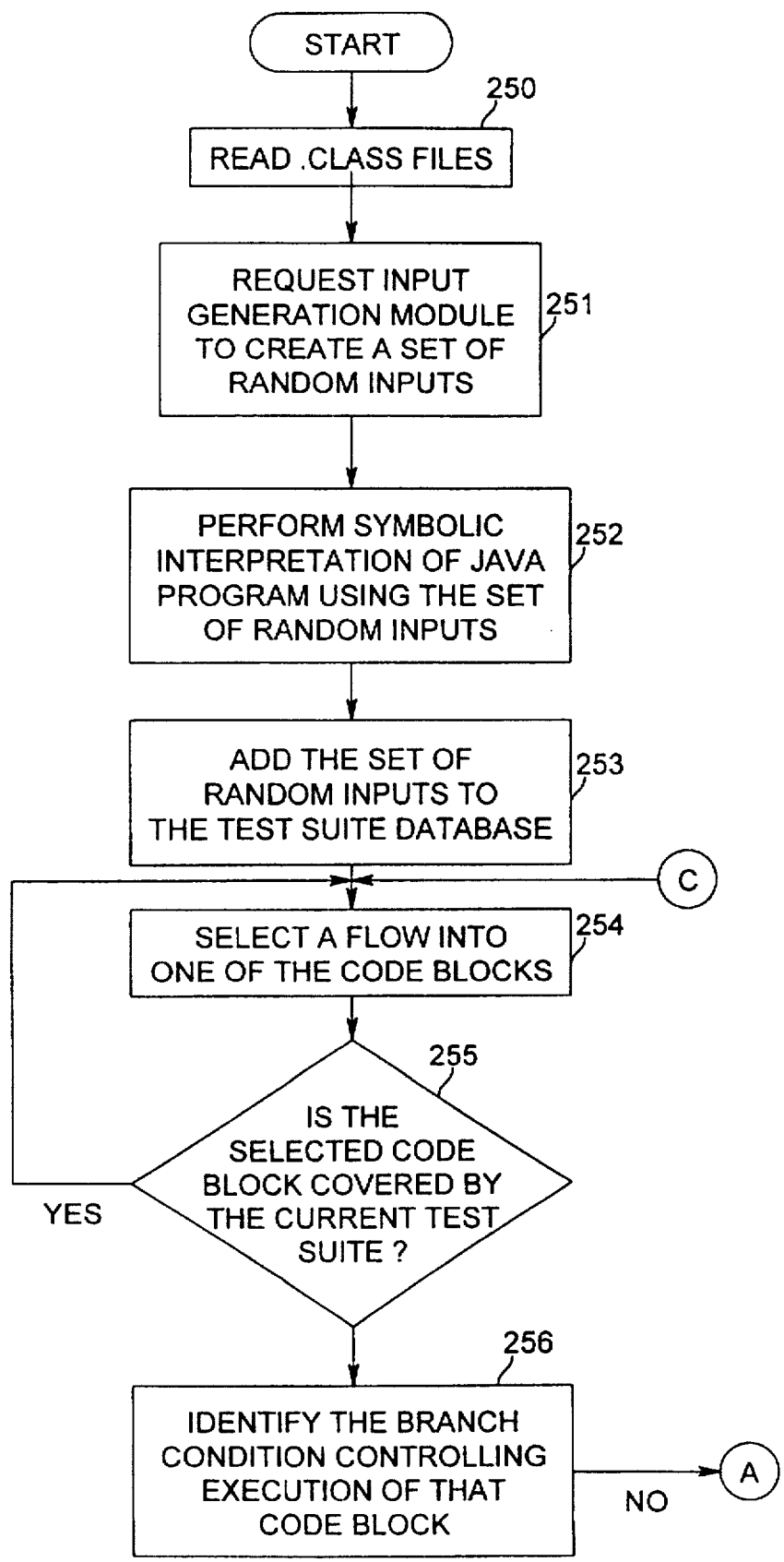
FIGS. 18A, 18B, and 18C are flow diagrams of a method using the TGS Driver Program for generating a computer program test suite for a JAVA program in accordance with the present invention
Figure 18B:
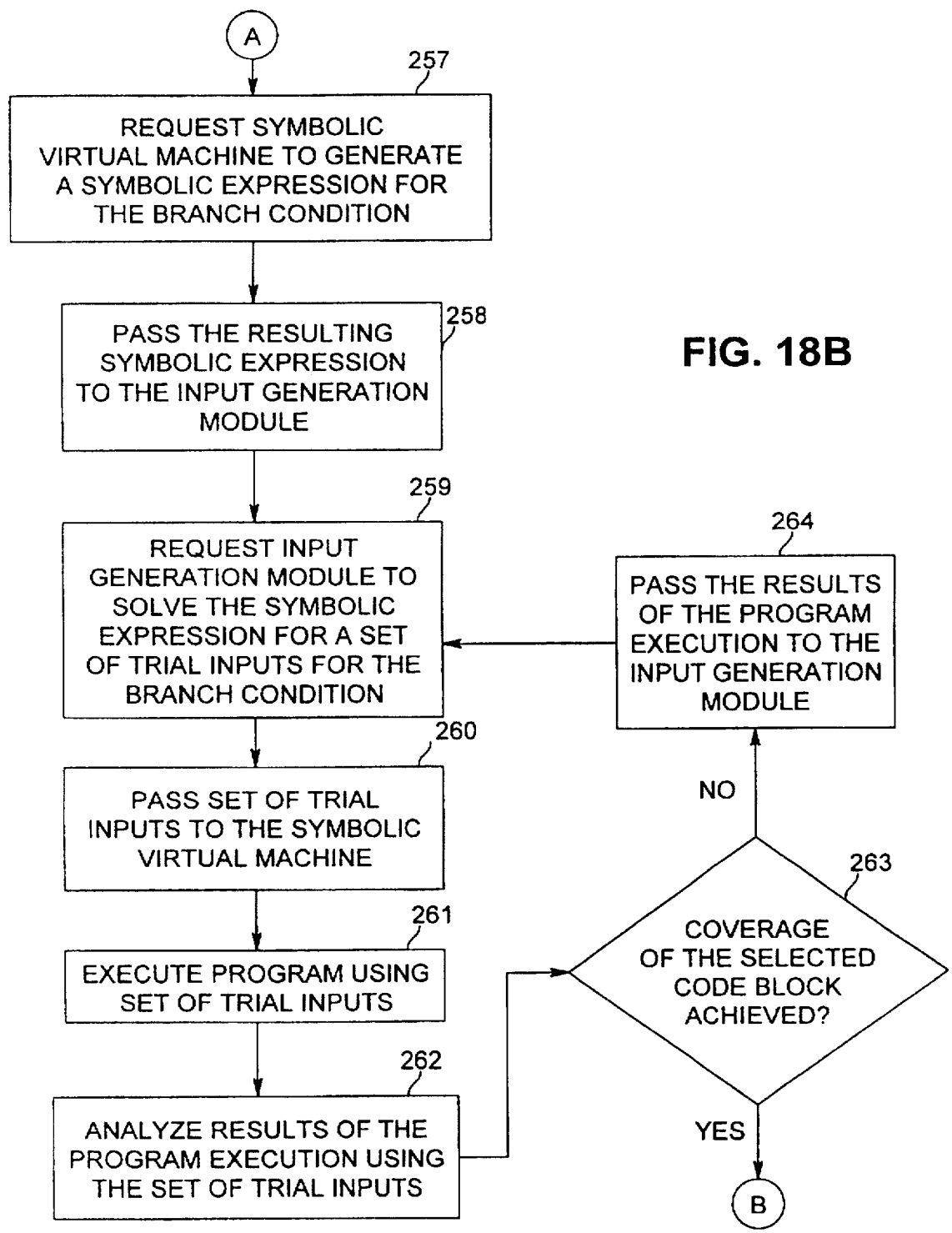
Figure 18C:
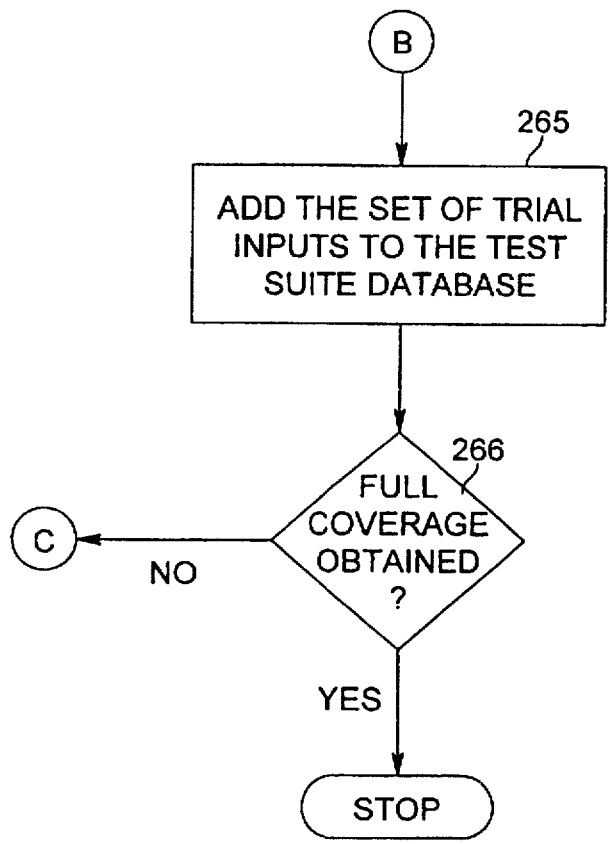

Referring to FIGS. 18A, 18B, and 18C, flow diagrams of a method using the TGS Driver Program 224 for generating a computer program test suite for a JAVA program in accordance with the present invention are shown. Initially, the JAVA TGS Driver Program generates a random set of inputs providing basic code coverage of the JAVA application or applet under test (blocks 251-253). Then, the TGS driver program iteratively processes each of the code blocks in the original source code using a pair of nested control loops. The outer control loop (blocks 254-266) iterates until coverage of substantially every code block has been obtained. The inner control loop (blocks 259-263) iterates until a set of inputs has been found that covers a selected individual code block.

Upon invocation of the TGS Program Driver, the Symbolic Virtual Machine (SVM) 234 reads the ".class" files of the JAVA program under test (block 250). The Decision Module 41 requests the Input Generation Module 43 to create a trial set of inputs using the random input generation module 71 (block 251) as is described above in FIG. 7.

Once a random set of inputs has been generated, symbolic interpretation of the JAVA program is performed by the SVM 234 using the random set of inputs (block 252) per instructions from the Decision Module 41. Only independent random sets of inputs are added to the Test Suite Database 226 (block 253). These are sets of inputs that result in code coverage different from that obtained with any of the other sets of inputs already present in the Test Suite Database 226.

A flow into one of the code blocks of the JAVA bytecodes 210 is selected by the decision module 41 (block 254). The goal of this step is to identify a code block in the JAVA bytecodes not covered by one of the sets of inputs currently in the Test Suite Database. If the selected code block is covered by one of the sets of inputs currently in the Test Suite Database (block 255), a new code block is selected (block 254). Otherwise, if the selected code block is not covered (block 255), the Decision Module 41 identifies the branch condition controlling the execution of that code block (block 256).

The Decision Module 41 requests the SVM 234 to generate a symbolic expression for the branch condition (block 257). The resulting symbolic expression is passed to the Input Generation Module 43 by the Decision Module 41 (block 258). The Decision Module 41 requests the Input Generation Module 43 to solve the symbolic expression for a trial set of inputs that satisfy the identified branch condition (block 259).

The Decision Module 41 passes the trial set of inputs to the SVM (block 260) which interprets the JAVA .class files using that trial set of inputs (block 261). The SVM 234 analyzes the results of the execution run and passes back those results to the Decision Module 41 (block 262).

If coverage of the selected code block has not been achieved by using the trial set of inputs as determined by the SVM (block 263), the results of the execution run by the SVM are passed to the Input Generation Module 43 (block 264) through the Decision Module for use in the generation of another trial set of inputs (block 259) at the top of the inner control loop (blocks 259-263). Otherwise, if coverage of the selected code block has been achieved (block 263), the trial set of inputs is added to the Test Suite Database 12 (block 265 on FIG. 18C).

If full coverage of substantially all code blocks in the program under test has not been obtained (block 266), control returns to the top of the outer control loop (blocks 254-266) for selection of another code block not already covered by one of the sets of inputs currently in the Test Suite Database 12. Otherwise, if full coverage has been obtained (block 266), the TGS Driver Program 224 terminates since it is no longer necessary to generate further sets of inputs.

C. Symbolic Virtual Machine

In this embodiment of the present invention, the symbolic execution module 42 of FIG. 5 is replaced by the Symbolic Virtual Machine 234 of FIG. 17. Referring to FIG. 19, a functional block diagram of the Symbolic Virtual Machine (SVM) is shown. The purpose of the SVM is to produce symbolic expressions for the variables of the JAVA program under test. Those symbolic expressions are used by the TGS Driver Program to find inputs to the JAVA program resulting specific criteria being met. The symbolic expressions represent information about the values that statements within a program can have. Requests for symbolic executions are received from the Decision Module 41 (block 300). The SVM symbolically interprets the JAVA program under test using information stored in the JAVA Bytecodes 210. Upon completion, symbolic expressions and associated path conditions are output by the SVM for all required branch conditions (block 302).

The SVM 234 includes a normal JAVA Virtual Machine as described in The JAVA Virtual Machine Specification, by Tim Lindholm and Frank Yellin, Addison Wesley, 1996, but with important additions. The normal JAVA Virtual Machine includes input from application .class files 304 and application native methods 308 from the JAVA bytecodes 210 and library .class files 306 and library native methods 309 from the JAVA Class Libraries 218. The normal JAVA Virtual Machine has a Method Area 310, an Execution Engine 312, a Heap 314, and Stack Frames 316. The Method Area 310 includes a Class and Method Area 318 and a Native Method Area 320. The Heap 314 includes a Numeric Heap 322. The Stack Frames 316 include a Local Variable Stack 324 and an Operand Stack 326.

The Method Area 310 is used to store internal representations of the .class files. The Execution Engine 312 starts executing the JAVA program by getting the method for the main entry point from the Method Area 310. For each method executed, the Execution Engine allocates a stack frame for it. The Stack Frame 316 includes a Local Variable Stack 324 and an Operand Stack 326. The Local Variable Stack 324 is used to store the values of the local variables of the method. The Operand Stack 326 is used to store values for intermediate results. For example, the Execution Engine 312 adds two local variables by getting their values from the Local Variable Stack and pushing those values onto the Operand Stack 326. The values on the Operand Stack are then added and the result is also put on the Operand Stack. Finally, the result value is transferred from the Operand Stack to the Local Variable Stack. The Stack Frames only store basic numeric types and references to objects. The objects themselves are allocated from the Heap 314, and its values are thus stored in the Heap.

In the present invention, features have been added to the normal JAVA Virtual Machine to implement symbolic execution of JAVA programs. The Stack Frames 316 of the JAVA Virtual Machine have slots formed of words in memory to store all of the values calculated for the stacks. The SVM has an additional symbolic slot for holding corresponding symbolic values for each normal slot. For example, there are symbolic slots for the Symbolic Local Variable Stack 328, Symbolic Operand Stack 330, array elements (not shown), and fields of JAVA objects (not shown).

The Symbolic Execution Engine 332 is the main component coordinating the dynamic symbolic execution of the JAVA program under test. It performs a function similar to an interpreter but instead of assigning real values to each program variable, it assigns symbolic values to each program variable. Symbolic values are expressions expressed as a function of the inputs to the program under test as further described above in Section V. The Symbolic Execution Engine 332 symbolically executes the JAVA program under test stored in the JAVA bytecodes. It performs symbolic operations corresponding to the operations the normal numeric Execution Engine 312 performs. For example, Execution Engine 312 performs an addition operation by popping the top two values of the Operand Stack 326, adding the two values together, and pushing the result back onto the Operand Stack. Symbolic Execution Engine 332 performs a symbolic addition operation by popping the top two values of the Symbolic Operand Stack 330, making a symbolic expression that represents the addition of the two values, and pushing this symbolic expression back onto the Symbolic Operand Stack.

Symbolic Interfaces 228 specify which library calls produce symbolic values as a result. Whenever a class is loaded into the Method Area 310, the SVM checks if a symbolic interface is available for it and if so, loads that symbolic interface into the Symbolic Class and Method Area 334. Whenever the Symbolic Execution Engine finds a library call, it checks to see if a symbolic interface exists in the Symbolic Class and Method Area. If one does exist, then the Symbolic Execution Engine 332 calculates a symbolic value using that interface and puts the value in the Symbolic Operand Stack 330. Finally, the Symbolic Heap 336 contains symbolic values for objects in the Heap 322.

Figure 20:
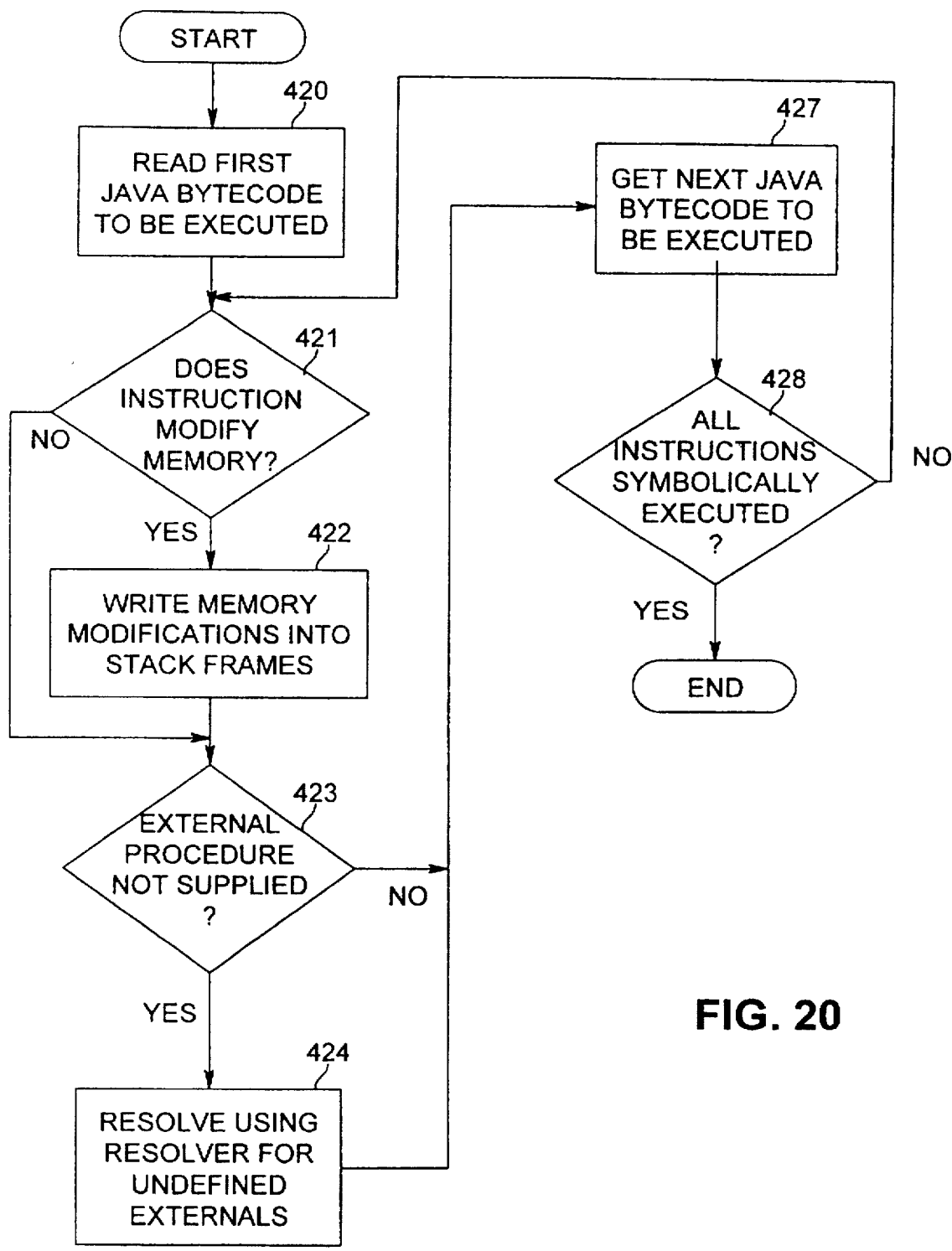
FIG. 20 is a flow diagram of a method for performing dynamic symbolic execution using the Symbolic Virtual Machine of FIG. 19 in accordance with the present invention.

FIG. 20 is a flow diagram of a method for performing dynamic symbolic execution using the Symbolic Virtual Machine of FIG. 19 in accordance with the present invention. The Symbolic Virtual Machine (SVM) 234 controls all symbolic execution. Preferably, the SVM discriminates between different program instructions and only does symbolic execution for instructions that modify symbolic values. The dynamic SVM symbolically executes the entire program under test even though non-symbolic dependent instructions are executed in the same way as a normal virtual machine and no symbolic execution is done for them.

The SVM iteratively processes (blocks 421–428) the instructions comprising the program under test using a JAVA bytecode representation. The SVM begins by reading the first JAVA bytecode from the .class files (block 420). If the instruction modifies a location in a memory used by the program under test to store and retrieve data values (block 421), the memory modifications are written into the appropriate Stack Frames 316 in symbolic form (block 422).

If the original JAVA source code 200 includes an external procedure call whose source code is not supplied in the original source code (block 423), that is, its program statements are unknown, the SVM 234 calls the Resolver For Undefined Externals module 236 to resolve the symbolic expression (block 424). The SVM then gets the next JAVA bytecode from the .class files (block 427). If all JAVA program instructions have not been symbolically executed (block 428), control returns to the top of the control loop (block 421) for processing of the next program instruction. Otherwise, the program ends.

VII. Using Symbolic Expressions to Detect Run-Time Errors in JAVA programs

The Test Generation System generates a test suite by using symbolic expressions to force the different branches of a program to be executed. Symbolic expressions may also be used to check if a runtime error is possible at any given point of the execution of a JAVA program and report the input value that will cause the error. Table II shows an example JAVA code fragment to illustrate the runtime error checking capability.

TABLE II

```
import java.io.*;
class Test {
  public static void main (String args []) throws Exception {
    StreamTokenizer st = new StreamTokenizer (
              new FileInputStream ("Test.in"));
    int [] intArray = new int [100];
    int index;
    st.nextToken();
    index = (int) st.nval;
    intArray [index] = 1
  }
}
```

The input for this program is in a file called "Test.in". For this example, the file contains the value "5". If the JAVA program is compiled and run, the program executes without any errors, as shown in Table III.

TABLE III

| $ javac Test.java | # compiles the program into Test.class file |
| $ java Test | # the standard java virtual machine executes |
| | # the program without error |

Nevertheless, the example program is not error proof. If the test input file contains, for example, the value 200, the program would then try to access the index 200 of the array "intArray". But this array has only 100 elements, so an exception would be thrown. The present invention finds this problem in the program and notifies the user of the runtime error so the user can change the program to check that the input values are within the bounds of the array. A sample output of TGS operating on the example program is shown in Table IV.

TABLE IV $tgs Test

—> EXCEPTION "ArrayIndexOutOfBoundsException" possible
- - - - - - - - - - - - - - - - - - - - - - - - - - - -
Stack trace:
  <Method Test.main([Ljava/lang/String;) V>, pc = 36
  [./Test.java, line 15]
For inputs:
S0 = [148:+INF], from <Method nextToken>
  called at: [Test.java,
  line 8]

The user can then fix the program by checking the array index as is shown in Table V below.

TABLE V

```
import java.io.*;
class Test {
  public static void main (String args[]) throws Exception {
    StreamTokenizer st = new StreamTokenizer (
              new FileInputStream ("Test.in"));
    int [] intArray = new int [100];
    int index;
    st.nextToken ();
    index = (int) st.nval;
    if (index >= 100) {
```

TABLE V-continued

```
      System.err.println ("index out of bounds from input
              file")
      System.exit (1);
    }
    intArray [index] = 1;
  }
}
```

This feature of detecting possible runtime errors is another application of the ability of the present invention to determine symbolic expressions for the statements within a program. The TGS Driver Program reads the application or applet to be executed and gets a set of input values for the program. The input values can be provided by the user or can be input from the Test Suite Database previously generated by the TGS Driver Program. The TGS Driver Program symbolically interprets each instruction in the program. Each instruction in the JAVA Bytecodes has a welldefined set of exceptions that can be thrown at run time. For each instruction executed, the TGS Driver Program checks if there is any input that would make one of those exceptions to be thrown. The TGS Driver Program can do this because it has symbolic expressions for the expression in the program under test. If the TGS Driver Program finds an input that would cause an exception be thrown, it adds that input to the Test Suite Database of inputs that cause exceptions in the program.

The TGS Driver Program executes the program for the path that corresponds to the input initially chosen and, for all of the instructions found in that path, looks for variations of the original input values that will cause runtime errors to occur.

Figure 21:
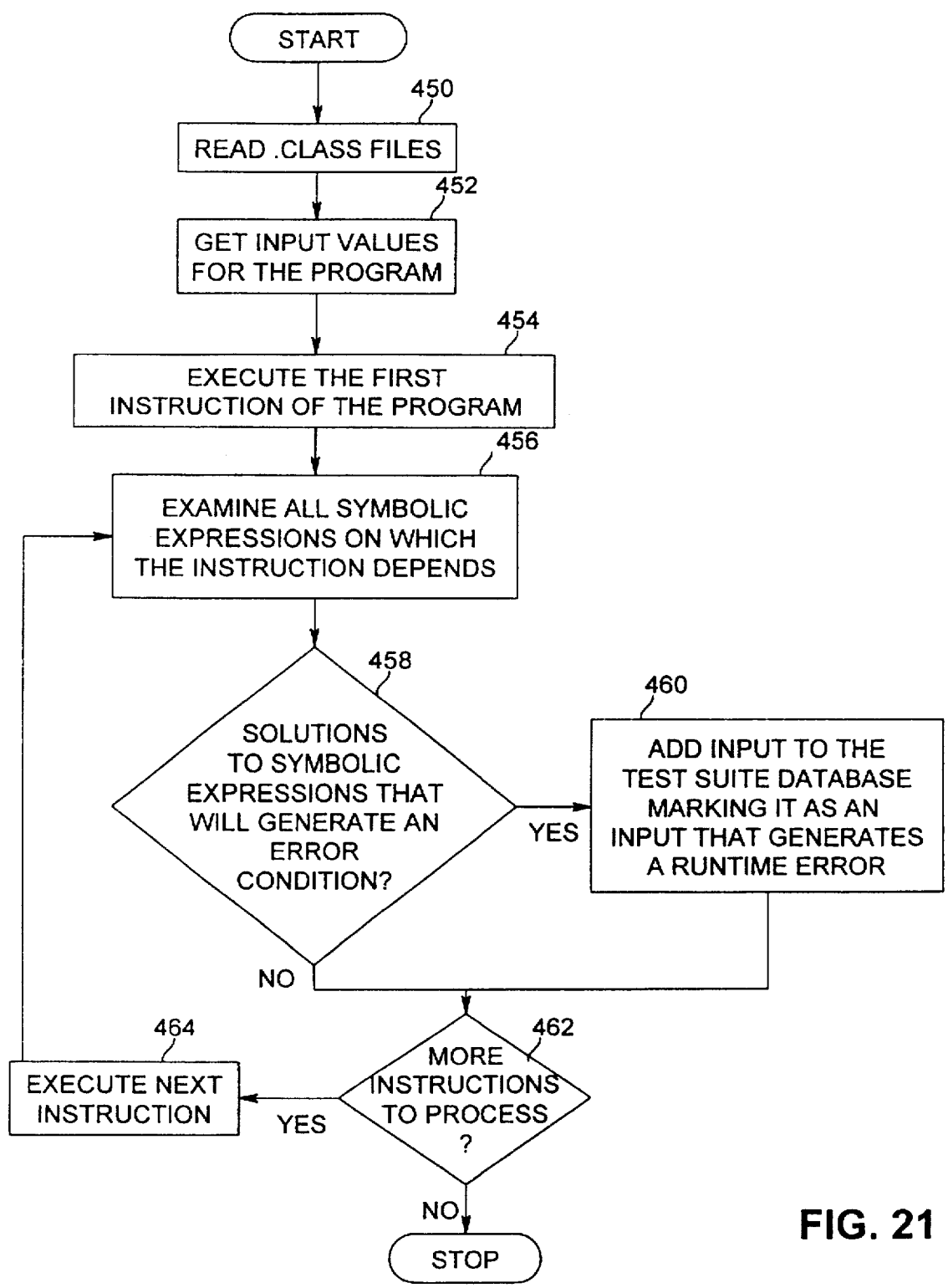
FIG. 21 is a flow diagram of the steps for identifying runtime errors.

FIG. 21 is a flow diagram of the steps for identifying runtime errors. First, the JAVA Bytecodes in the .class files are read by the TGS Driver Program at step 450. At step 452, input values for the program are obtained. Next, at step 454, the first instruction in the program is symbolically executed. All symbolic expressions that the instruction depends on are examined at step 456. If there are solutions to those symbolic expressions that will generate an error condition at test step 458, then add the current input value to the Test Suite Database marking it as an input that generates a runtime error (step 460). Otherwise, processing continues with the next instruction. If there are any more instructions to be processed (test step 462), then the next instruction is executed at step 464. If all instructions have been processed, then runtime error checking of JAVA Bytecodes is complete.

VIII. Module Testing of JAVA Programs

Module testing consists of testing incomplete applications or applets, or testing modules that do not yet have a main program that calls them. The TGS Driver Program can also be used to perform module testing. Providing this feature in the present system requires a determination of how to treat the undefined external references and/or the missing main method. The natural extension of the TGS framework is to treat all of the undefined external references as symbolic values and consider them as inputs to the Java program under test. The program is thus tested for all possible values of the undefined externals. In this way, if the TGS tests the modules, it can be determined that the modules are tested for all possible inputs and so no errors will be found when the module is used in the complete program.

To handle a program with undefined external references, the external call to be resolved is extended by generating a symbolic value for the external call. Referring back to FIG. 17, when the Symbolic Virtual Machine (SVM) 234 finds an undefined external reference, it asks the Resolver For Undefined Externals 236 for a symbolic expression for the reference. The Resolver returns symbolic information according to the known properties of the undefined external reference. To handle a program module without a main method, the TGS executes the module by calling all of its entry points and assigning symbolic values to the parameters of each entry point.

A simple example for module testing is shown below in Table VI.

TABLE VI

```
public class MT_basic {
    static void method1 () // no errors in this method
    {
        int i;
        i = 7;
    }
    static void method2 (int index)
    {
        int arr [] = new int [10];
        arr [index] = 1; // error possible
    }
}
```

The module of Table VI has two methods. The first method of the module cannot create any runtime error. The second method, however, can generate a runtime error. For example, if the second method is called with an argument value of 20, the access to the array "arr" will cause an array out of bounds exception. Note that this JAVA program does not have a main method and thus it cannot be executed by a normal JAVA Virtual Machine. However, the Symbolic Virtual Machine 234 will symbolically execute this module by calling the methods in the module directly and providing arguments for them. Processing this example by TGS yields the results shown in Table VII.

TABLE VII

```
$ tgs -module MT_Basic
—> testing <Method MT_Basic.method1 ()V>
NO ERRORS FOUND
—> testing <Method MT_Basic.method2 ()V>
```
—>EXCEPTION "ArrayIndexOutOfBoundsException" possible
- - - - - - - - - - - - - - - - - - - - - - - - - - -
Stack trace:
    <Method MT_Basic.method2 (I) V>, pc = 8
    [./MT_Basic.java, line 11]
- - - - - - - - - - - - - - - - - - - - - - - - - - -
For inputs:
S1 = [10:+INF], from input argument to:
    <Method MT_Basic.method2 (I) V>

Referring back to FIG. 17, the Module Testing Module (MTM) 238 is responsible for deciding which methods need to be called in the module under test and which arguments need to be passed to them.

Figure 22:
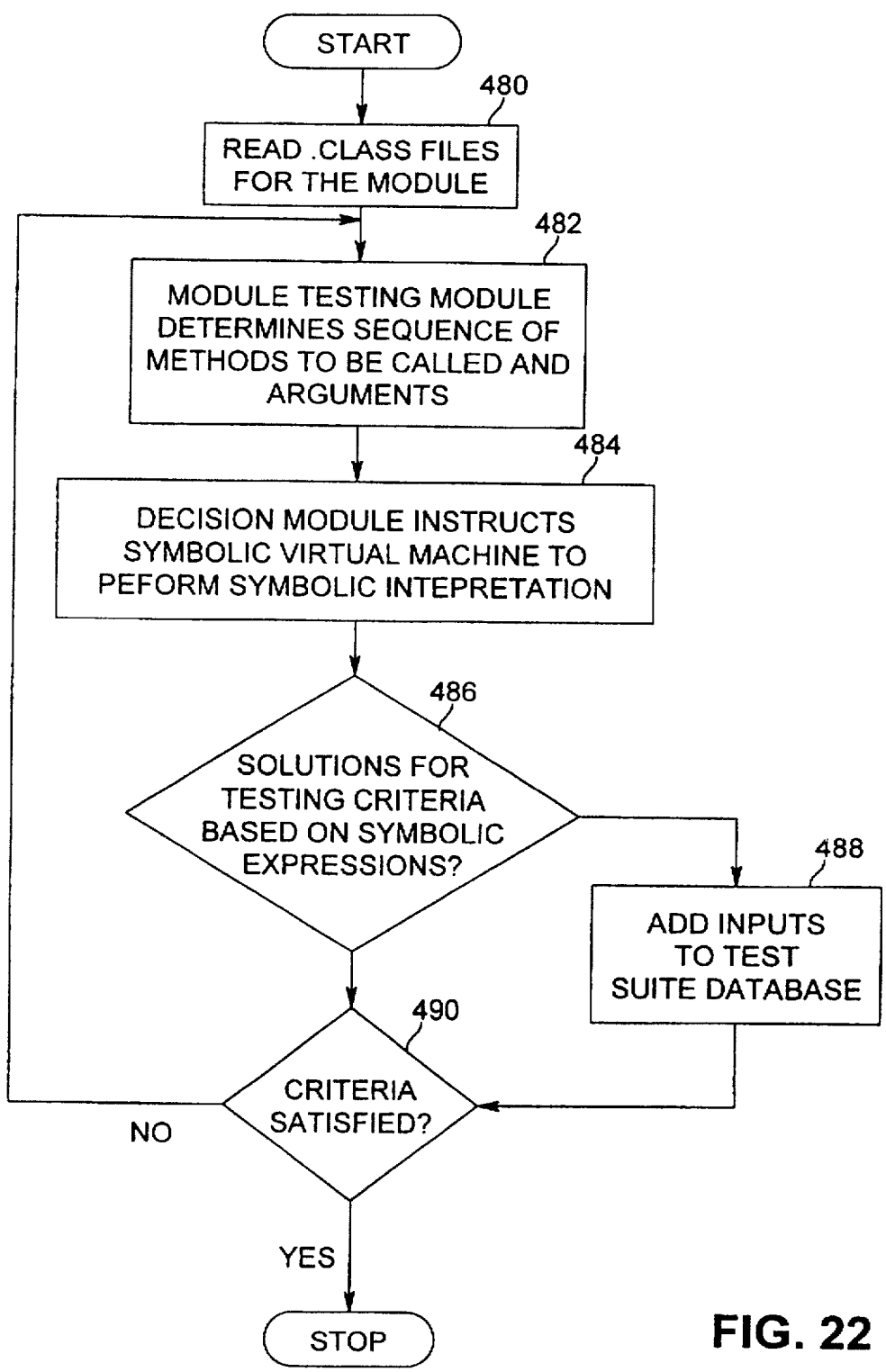
FIG. 22 is a flow diagram of the steps for processing modules according to the present invention.

FIG. 22 is a flow diagram of the steps for processing modules according to the present invention. First, the TGS Driver Program reads the JAVA Bytecodes in the .class files for the module under test at step 480. The Module Testing Module 238 at step 482 decides on a first sequence of methods to be executed (for example, a random sequence or calling each method once) and the arguments to be passed to them. At step 484, the Decision Module 41 instructs the Symbolic Virtual Machine (SVM) 234 to perform the symbolic execution that corresponds to the selected sequence. This effort is the same as for normal (non-module) testing. The SVM calculates symbolic expressions and uses them to find input values that cause a given criteria to be satisfied. Next, the MTM 238 decides if there are solutions for the testing criteria at test step 486. If so, Yes path is taken to step 488, where the input values are added to the Test Suite Database 226. Otherwise, processing continues with test step 490. If the coverage criteria is not satisfied, the MTM decides on another sequence of methods to call and input arguments to pass to those methods and processing continues with step 482. To do this it uses the information stored in the Test Suite Database to find out which calling sequence whose execution will increase the chances of generating the criteria to be satisfied.

IX. JAVA Bytecode Instrumentation

The TGS can be used for instrumentation of JAVA Bytecodes. The TGS takes the .class file for a program and generates another .class file with additional instrumentation in it by adding extra bytecodes. These added bytecodes call specific functions that generate statistics or gather information about the program. Bytecode instrumentation can be used for profiling code (i.e., adding bytecodes that keep track of what portions of the code get executed), and extra error checking. For example, this feature is used to determine the precise form of a "for" loop in the original program. In the bytecode .class file, the "for" loop appears as a sequence of "if" and "goto" bytecode instructions. Instrumentation can be added to communicate more details about the original form of the "for" loop in the source code. Referring back to FIG. 16, the JAVA Parser 230 is used to gather extra information about the program and to write this information into the output .class file by adding the information to that file as JAVA class attributes. If bytecode instrumentation is needed, the JAVA Parser inserts extra bytecodes in the bytecodes of the original .class file and writes those new bytecodes into the output .class file. The generated .class file follows the normal .class file specification. Hence, the new .class file can be executed by any JAVA Virtual Machine, not just the Symbolic Virtual Machine of the present invention. A normal JAVA Virtual Machine can be used to execute the instrumented bytecodes in order to gather extra information about the JAVA program under test.

Figure 23:
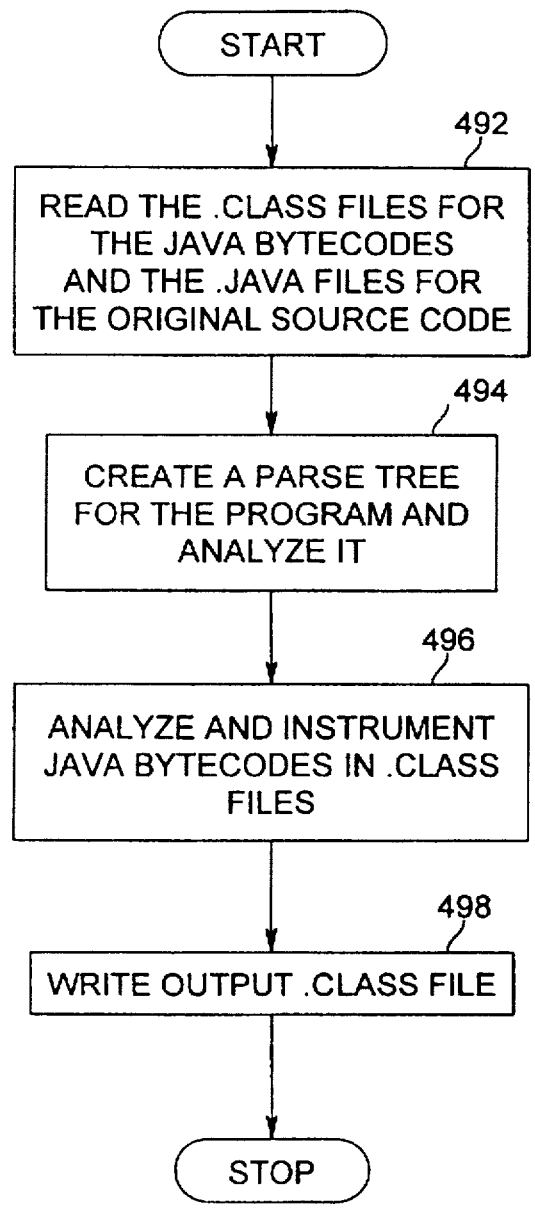
FIG. 23 is a flow diagram of the steps for handling JAVA bytecode instrumentation.

FIG. 23 is a flow diagram of the steps for handling JAVA bytecode instrumentation. At step 492, the JAVA Parser 230 reads the .class files 210 generated by the JAVA Compiler 208 and the .java files 200 of the original source code. Next, at step 494, the JAVA Parser creates a parse tree for the JAVA program and analyzes it by identifying points in the computer program where instrumentation can be inserted. At step 496, the bytecodes in the .class file are analyzed and a new stream of bytecodes with appropriate instrumentation is calculated. An equivalent .class file is then written as output at step 498. The information obtained by analyzing the parse tree is added as additional JAVA class attributes to the file. The output .class file also includes the instrumented bytecodes.

While various embodiments of the invention have been particularly shown, it will be understood by those skilled in the art that various changes in form and detail may be made without departing from the scope and spirit of the present invention.

What is claimed is:

1. A system for generating a test suite for use in testing a computer program written in the JAVA programming language, the computer program having been compiled by a JAVA compiler into JAVA bytecodes, comprising:

means for symbolically executing instructions of the computer program represented by the JAVA bytecodes to determine values of program variables of the computer program at selected points of execution and for finding input values to the computer program resulting in complete test coverage of the computer program according to a predetermined criteria based on the symbolic execution; and means for storing the input values as a test suite for testing the computer program.

2. The system of claim 1 wherein the symbolic execution means comprises:

means for reading the JAVA bytecodes and for performing numeric and symbolic execution of the JAVA bytecodes.

3. The system of claim 2, wherein the reading and performing means comprises:

a numeric JAVA virtual machine for performing numeric execution of the JAVA bytecodes; and a symbolic virtual machine for performing symbolic execution of the JAVA bytecodes.

4. The system of claim 3, wherein the symbolic virtual machine reads application class definitions and application native methods from the JAVA bytecodes, and library class definitions and library native methods from standard JAVA class libraries.

5. The system of claim 3, wherein the symbolic virtual machine comprises:

a symbolic class and method area;

a symbolic execution engine;

a symbolic heap;

a symbolic local variable stack; and a symbolic operand stack.

6. The system of claim 3, wherein the symbolic virtual machine outputs symbolic expressions and path conditions for all required branch conditions of the computer program.

7. The system of claim 2, wherein the symbolic execution means further comprises:

means for generating sets of input values for the computer program.

8. The system of claim 7, wherein the symbolic execution means further comprises:

means for coordinating operations performed by the reading and performing means, and the generating means, and for directing the storing means to store the input values.

9. The system of claim 8, wherein the symbolic execution means further comprises:

means for resolving undefined external references in the computer program.

10. The system of claim 8, wherein the symbolic execution means further comprises:

means for determining which JAVA methods in an independent and incomplete module of the computer program need to be called and for determining arguments that need to be passed into the JAVA methods for undefined external references.

11. The system of claim 10, wherein the determining means comprises:

means for generating symbolic values input to the computer program for all undefined external references present in the independent and incomplete module.

12. The system of claim 8, wherein the symbolic execution means further comprises:

means for detecting potential runtime errors in instructions of the computer program caused by values of the program variables.

13. The system of claim 1, further comprising:

means for parsing the JAVA bytecodes and for inserting instrumentation information into the JAVA bytecodes.

14. The system of claim 13, wherein the symbolic execution means comprises means for performing error checking of the computer program based on the instrumentation information.

15. The system of claim 13, wherein the symbolic execution means comprises means for generating statistical data of execution of instructions of the computer program based on the instrumentation information.

16. A method using a computer for generating a test suite for a computer program written in the JAVA programming language, the computer program comprising program statements and program variables and being represented as JAVA bytecodes after being compiled by a JAVA compiler, the computer program including at least one input statement having one or more input variables, grouped into code blocks, the test suite comprising sets of inputs, each of the sets of inputs corresponding to each of the input statements, comprising the steps of:

reading the program statements corresponding to a candidate code block from the JAVA bytecodes;

representing each of the input variables for each input statement and each of the program variables in symbolic form as a symbolic memory value and transforming each program statement dependent on such an input variable into a symbolic expression;

creating a trial set of inputs for each of the input statements by finding a solution to the symbolic expression comprising actual input values corresponding to each symbolic memory value using dynamic symbolic execution of the JAVA bytecodes;

interpreting the JAVA bytecodes using the trial set of inputs and analyzing results obtained for coverage of the candidate code block; and storing the trial set of inputs into the test suite if coverage of the candidate code block was obtained.

17. A method according to claim 16, the step of transforming further comprising the steps of:

selecting one of the program statements in the JAVA bytecodes;

symbolically executing the selected program statement using the symbolic memory values for each of the input variables and the program variables contained in the selected program statement; and creating a symbolic expression based on results obtained from the symbolic execution.

18. A method according to claim 17, further comprising the steps of:

determining whether the program statement is an external procedure call whose program statements are unknown; and resolving the external procedure call.

19. A method according to claim 18, further comprising the steps of:

determining whether the selected program statement contains a branch condition;

converting each branch condition into a symbolic expression by replacing each of the input variables and the program variables contained in the branch condition with a symbolic memory value; and finding such a trial set of inputs for resolving the branch condition to take such actual input values that will force execution of the candidate code block.

20. A method according to claim 16, further comprising the step of:

instrumenting the JAVA bytecodes with instrumentation function calls comprising at least one of an instrumentation function call for coverage analysis, an instrumentation function call for block flow analysis or an instrumentation function call for branch condition analysis.

21. A method according to claim 16, further comprising the step of:

maintaining a program database for flow information as to paths of execution occurring in the computer program by breaking down the program statements into the code blocks and storing the code blocks in the program database.

22. A system for generating a test suite for a computer program written in the JAVA programming language, the computer program comprising program statements and program variables and represented as JAVA bytecodes after being compiled by a JAVA compiler, the computer program including at least one input statement having one or more input variables, grouped into code blocks and stored in a program database, the test suite comprising sets of inputs, each of the sets of inputs corresponding to each of the input statements, comprising:

means for reading the program statements corresponding to a candidate code block from the JAVA bytecodes;

means for representing each of the input variables for each input statement and each of the program variables in symbolic form as a symbolic memory value and means for transforming each program statement dependent on such an input variable into a symbolic expression;

means for creating a trial set of inputs for each of the input statements by finding a solution to the symbolic expression comprising actual input values corresponding to each symbolic memory value using dynamic symbolic execution of the JAVA bytecodes;

means for interpreting the JAVA bytecodes using the trial set of inputs and means for analyzing results obtained for coverage of the candidate code block; and means for storing the trial set of inputs into the test suite if coverage of the candidate code block was obtained.

23. A method of operating a computer system for performing dynamic symbolic execution by a symbolic virtual machine of a computer program written in the JAVA programming language and represented as JAVA bytecodes after being compiled by a JAVA compiler, the computer system having a memory, the method comprising the steps of:

reading a JAVA bytecode to be executed;

writing memory modifications into selected memory areas of the symbolic virtual machine when the JAVA bytecode being executed modifies a location in computer system memory;

resolving any undefined external references included in the JAVA bytecode; and repeating the reading, writing and resolving steps for all JAVA bytecodes in the computer program.

24. A computer-implemented method of detecting runtime errors in a computer program written in the JAVA programming language, the computer program being represented by JAVA bytecodes after being compiled by a JAVA compiler, the computer-implemented method comprising the steps of:

reading the JAVA bytecodes;

obtaining at least one input value for the computer program;

symbolically executing an instruction of the computer program represented in the JAVA bytecodes;

examining all symbolic expressions on which the instruction depends based on the symbolic execution; and storing the at least one input value in a test database and marking the at least one input value as an input that generates a runtime error when a solution to the symbolic expressions generates an error condition.

25. A computer-implemented method of generating a test suite for a module of an incomplete application program written in the JAVA programming language having undefined external references or a missing main method, the application program being represented by JAVA bytecodes after being compiled by a JAVA compiler, the computer-implemented method comprising the steps of:

reading the JAVA bytecodes for the module;

determining a sequence of JAVA methods to be called in the module and arguments to be passed to the JAVA methods;

performing symbolic interpretation of the sequence of JAVA methods of the JAVA bytecodes by calculating symbolic expressions for the JAVA methods and using the symbolic expressions to determine input values causing a predetermined testing criteria to be satisfied;

storing the input values in a test suite database when solutions for the predetermined testing criteria based on the symbolic expressions are found for the input values; and repeating the determining and performing steps when solutions are not found for the predetermined testing criteria based on the symbolic expressions.

26. A computer-implemented method of inserting instrumentation information into JAVA bytecodes produced by compiling a computer program written in the JAVA programming language, comprising the steps of:

reading the JAVA bytecodes and the computer program;

creating a parse tree for the computer program and analyzing the parse tree to identify points in the computer program where instrumentation can be inserted;

analyzing the JAVA bytecodes and instrumenting the JAVA bytecodes at the identified points; and writing a new set of JAVA bytecodes including the instrumentation information.

* * * * *